US011122600B2

(12) United States Patent
Moroga et al.

(10) Patent No.: US 11,122,600 B2
(45) Date of Patent: Sep. 14, 2021

(54) TERMINALS RECEIVING DOWNLINK CONTROL SIGNALS AND DOWNLINK DATA SIGNALS

(71) Applicant: NTT DOCOMO, INC., Tokyo (JP)

(72) Inventors: Hideyuki Moroga, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/470,092

(22) PCT Filed: Nov. 30, 2017

(86) PCT No.: PCT/JP2017/042954
§ 371 (c)(1),
(2) Date: Jun. 14, 2019

(87) PCT Pub. No.: WO2018/116777
PCT Pub. Date: Jun. 28, 2018

(65) Prior Publication Data
US 2020/0245347 A1    Jul. 30, 2020

(30) Foreign Application Priority Data

Dec. 19, 2016   (JP) .............................. JP2016-245981

(51) Int. Cl.
*H04W 72/04* (2009.01)
*H04W 72/12* (2009.01)
(Continued)

(52) U.S. Cl.
CPC ...... *H04W 72/1268* (2013.01); *H04B 7/0413* (2013.01); *H04L 27/2649* (2013.01); *H04W 72/042* (2013.01); *H04W 72/0446* (2013.01)

(58) Field of Classification Search
CPC ......... H04W 72/1268; H04W 72/0446; H04W 72/042; H04L 27/2649; H04B 7/0413
See application file for complete search history.

(56) References Cited

U.S. PATENT DOCUMENTS

2010/0329393 A1\* 12/2010 Higuchi ............ H04L 25/03216
                                                          375/340
2014/0301286 A1\* 10/2014 Abe ...................... H04L 1/0027
                                                          370/329
(Continued)

FOREIGN PATENT DOCUMENTS

| JP | 2009213124 A | 9/2009 |
| JP | 2014112944 A | 6/2014 |
| WO | 2015109607 A1 | 7/2015 |

OTHER PUBLICATIONS

Park U.S. Appl. No. 62/350,170, filed Jul. 2016.*
(Continued)

*Primary Examiner* — Lakeram Jangbahadur
(74) *Attorney, Agent, or Firm* — Osha Bergman Watanabe & Burton LLP

(57) ABSTRACT

A new configuration suitable for a downlink single carrier is provided in a downlink control signal of a radio communication system of the future. A user terminal includes: a reception section that receives a downlink signal including a downlink control signal and a downlink data signal; and a demodulation and decoding section that uses the downlink control signal to demodulate and decode the downlink data signal, in which the downlink control signal is mapped to signal transmission points of a single carrier in units of control channel elements.

4 Claims, 21 Drawing Sheets

(51) Int. Cl.
*H04B 7/0413* (2017.01)
*H04L 27/26* (2006.01)

(56) References Cited

U.S. PATENT DOCUMENTS

2016/0330723 A1* 11/2016 Gao .................. H04W 72/0446
2019/0158259 A1* 5/2019 Park .................... H04L 1/0061

OTHER PUBLICATIONS

International Search Report issued for PCT/JP2017/042954, dated Feb. 13, 2018 (4 pages).
Written Opinion issued for PCT/JP2017/042954, dated Feb. 13, 2018 (4 pages).
3GPP TS 36.300 V13.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Jun. 2016 (310 pages).
Office Action issued in related Chinese Application No. 201780077584.4 dated Jul. 5, 2021 (18 pages).

\* cited by examiner

TERMINALS RECEIVING DOWNLINK CONTROL SIGNALS AND DOWNLINK DATA SIGNALS

TECHNICAL FIELD

The present invention relates to a user terminal in a next-generation mobile communication system.

BACKGROUND ART

In a UMTS (Universal Mobile Telecommunication System) network, Long Term Evolution (LTE) is specified for a higher data rate, lower latency, and the like (NPL 1). For a broader bandwidth and a higher speed based on LTE, successor systems of LTE are also studied. Examples of the successor systems of the LTE include so-called LTE-A (LTE-Advanced), FRA (Future Radio Access), 5G (5th generation mobile communication system), 5G+ (5G plus), and New-RAT (Radio Access Technology).

Using a high frequency band of 30 GHz or higher as a radio frequency is studied in a radio communication system of the future. Using a single carrier or DFT (Discrete Fourier Transform) Spread OFDM (Orthogonal Frequency Division Multiplexing) for a transmission waveform in a downlink of a high frequency band is also studied in the radio communication system of the future. In this case, the single carrier or the DFT Spread OFDM can be used to reduce the PAPR.

CITATION LIST

Non-Patent Literature

NPL 1
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)." June 2016

SUMMARY OF INVENTION

Technical Problem

However, there is currently no downlink single carrier or downlink DFT Spread OFDM in 5G.

An aspect of the present invention provides a new configuration suitable for a single carrier or DFT Spread OFDM in a downlink control signal of a radio communication system of the future.

Solution to Problem

An aspect of the present invention provides a user terminal including: a reception section that receives a downlink signal including a downlink control signal and a downlink data signal; and a demodulation and decoding section that uses the downlink control signal to demodulate and decode the downlink data signal, in which the downlink control signal is mapped to signal transmission points of a single carrier in units of control channel elements.

An aspect of the present invention provides a user terminal including: a reception section that receives a downlink signal including a downlink control signal and a downlink data signal; and a demodulation and decoding section that uses the downlink control signal to demodulate and decode the downlink data signal, in which the downlink control signal is mapped to contiguous subcarriers in units of control channel elements.

Advantageous Effects of Invention

According to the aspect of the present invention, a new configuration suitable for a single carrier is provided in the downlink control signal of the radio communication system of the future.

According to the aspect of the present invention, a new configuration suitable for DFT Spread OFDM is provided in the downlink control signal of the radio communication system of the future.

DESCRIPTION OF EMBODIMENTS

Hereinafter, Embodiments of the present invention will be described with reference to the accompanying drawings.

Embodiment 1

Figure 1:
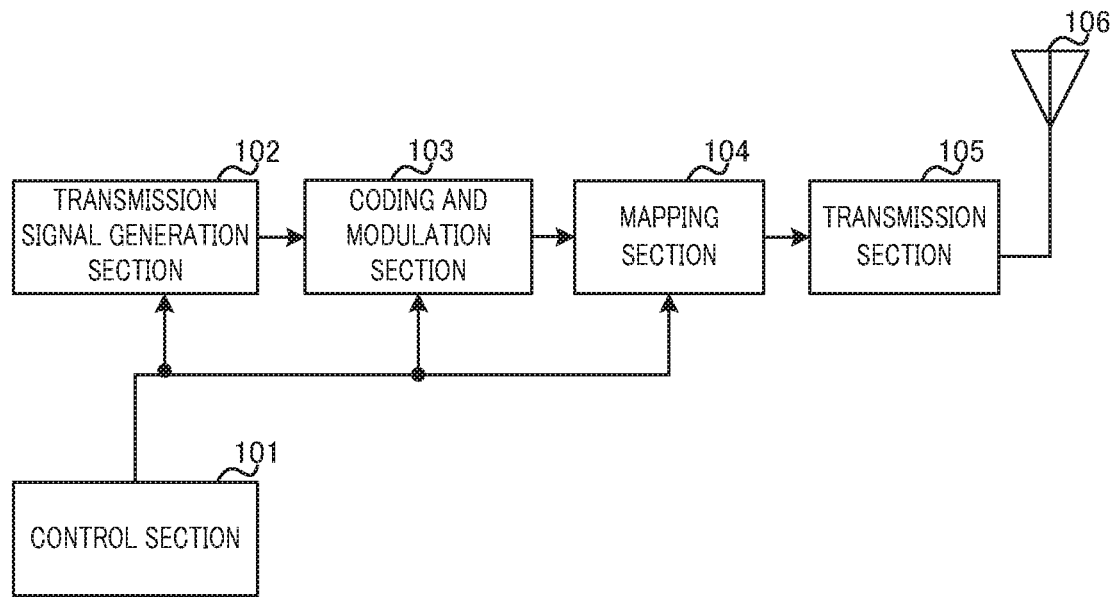
FIG. 1 illustrates a configuration example of functional blocks of a radio base station according to Embodiment 1.
Figure 2:
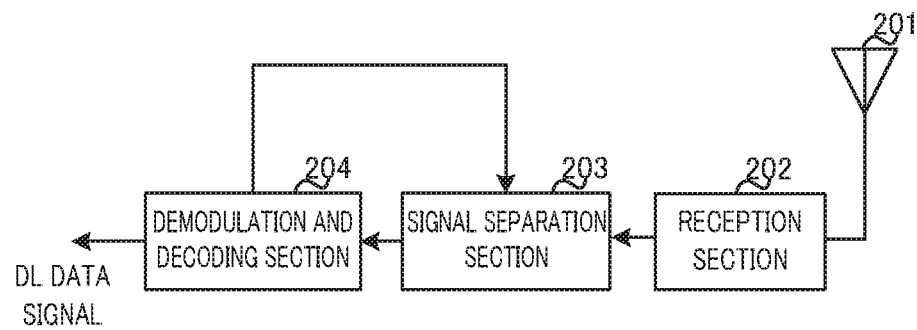
FIG. 2 illustrates a configuration example of functional blocks of a user terminal according to Embodiment 1.

A radio communication system according to Embodiment 1 includes at least radio base station 10 shown in FIG. 1 and user terminal 20 shown in FIG. 2. User terminal 20 is connected to radio base station 10. Radio base station 10 transmits a DL (Down Link) signal to user terminal 20. The DL signal includes, for example, a DL data signal (for example, PDSCH (Physical Downlink Shared Channel)) and a DL control signal (for example, PDCCH (Physical Downlink Control Channel)) for demodulating and decoding the DL data signal.

FIG. 1 illustrates a configuration example of functional blocks of the radio base station according to Embodiment 1. Radio base station 10 shown in FIG. 1 includes control section 101, transmission signal generation section 102, coding and modulation section 103, mapping section 104, transmission section 105, and antenna 106.

Control section 101 is, for example, a scheduler. Control section 101 creates a schedule (for example, resource assignment) of the DL signal. Control section 101 assigns time regions (time direction) of radio resources of a single carrier described later to the DL signal. Control section 101 outputs the generated scheduling information to transmission signal generation section 102, coding and modulation section 103, and mapping section 104.

Transmission signal generation section 102 generates a DL signal including a DL data signal and a DL control signal. The DL control signal included in the DL signal includes, for example, downlink control information (DCI) including the scheduling information output from control section 101. Transmission signal generation section 102 outputs the generated DL signal to coding and modulation section 103.

Coding and modulation section 103 applies coding processing and modulation processing to the DL signal generated by transmission signal generation section 102 based on the scheduling information generated by control section 101. Coding and modulation section 103 outputs the DL signal after the coding processing and the modulation processing to mapping section 104.

The DL signal output from coding and modulation section 103 is input to mapping section 104. The scheduling information output from control section 101 is also input to mapping section 104. Based on the scheduling information output from control section 101, mapping section 104 maps the DL signal output from transmission signal generation section 102 on the radio resources of the single carrier.

Mapping section 104 outputs the DL signal mapped to the radio resources to transmission section 105. Note that details of the mapping method of the DL control signal will be described later.

Transmission section 105 applies transmission processing, such as up-conversion and amplification, to the DL signal output from mapping section 104 and transmits the DL signal (radio frequency signal) from antenna 106.

FIG. 2 illustrates a configuration example of functional blocks of the user terminal according to Embodiment 1. User terminal 20 shown in FIG. 2 includes antenna 201, reception section 202, signal separation section 203, and demodulation and decoding section 204.

A DL signal (radio frequency signal) received by antenna 201 is input to reception section 202. The DL signal includes a DL data signal, a DL control signal, and the like.

Reception section 202 applies reception processing, such as amplification and down-conversion, to the radio frequency signal received by antenna 201 and outputs a baseband DL signal to signal separation section 203.

Signal separation section 203 separates (demaps) the DL control signal from the DL signal output from reception section 202 based on the mapping configuration of the DL control signal. Signal separation section 203 outputs the DL control signal separated from the DL signal to demodulation and decoding section 204.

Signal separation section 203 also separates (demaps) the DL data signal from the DL signal based on the scheduling information (for example, assigned resources) input from demodulation and decoding section 204. Signal separation section 203 outputs the DL data signal separated from the DL signal to demodulation and decoding section 204.

Demodulation and decoding section 204 demodulates the DL control signal output from signal separation section 203. Demodulation and decoding section 204 applies decoding processing (for example, blind detection processing) to the demodulated DL control signal and specifies the DL control signal for user terminal 20. Demodulation and decoding section 204 outputs the scheduling information and the like included in the specified DL control signal for user terminal 20 to signal separation section 203. Demodulation and decoding section 204 applies demodulation processing and decoding processing to the DL data signal output from signal separation section 203.

Figure 3:
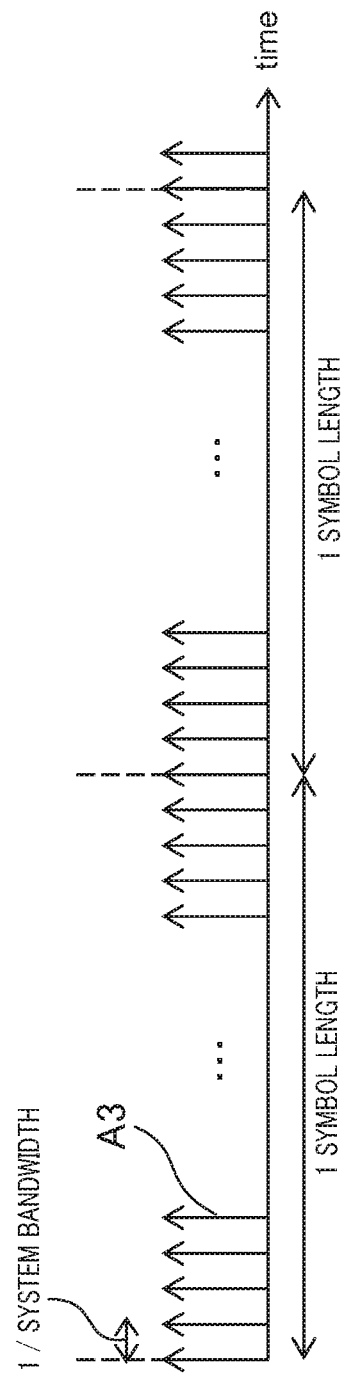
FIG. 3 illustrates a mapping example of a DL control signal according to Embodiment 1.

FIG. 3 illustrates a mapping example of the DL control signal according to Embodiment 1. The horizontal axis shown in FIG. 3 indicates a time axis. Arrows A3 shown in FIG. 3 indicate transmission points of the DL signal transmitted by the single carrier. Hereinafter, the transmission points indicated by arrows A3 will be referred to as sample points in some cases. Intervals of the sample points are, for example, "1/system bandwidth". Note that the transmission points indicated by arrows A3 of FIG. 3 may be referred to as subcarriers, tones, resource elements, components, symbols, mini symbols, or samples. Therefore, the name of the transmission points indicated by arrows A3 in FIG. 3 is not limited to sample points. The transmission points are not limited to the listed names.

A part between dotted lines shown in FIG. 3 indicates 1 symbol (or slot, mini slot) length including a set of a plurality of sample points. 1 subframe (or TTI) (not shown) is formed by a set of a plurality of symbols.

The DL signal is mapped to the sample points indicated by arrows A3 and transmitted to user terminal 20. The DL control signal included in the DL signal is mapped to, for example, the sample points of top two symbols of 1 subframe. The DL data signal included in the DL signal is mapped to, for example, sample points of third and subsequent symbols of 1 subframe.

In this way, the DL control signal is mapped to the sample points of the single carrier. According to the processing, a new configuration suitable for the single carrier is provided in the downlink control signal of the radio communication system of the future.

The single carrier can also reduce the PAPR of the signal. Therefore, the radio communication system can increase the amplification efficiency of the power amplifier in the downlink.

The single carrier can also compensate the phase noise of the signal. Therefore, the radio communication system can compensate the phase noise of the signal in the downlink.

[Modification 1 of Embodiment 1]

A configuration of CCE (Control Channel Element) will be described in Modification 1 of Embodiment 1.

Figure 4:
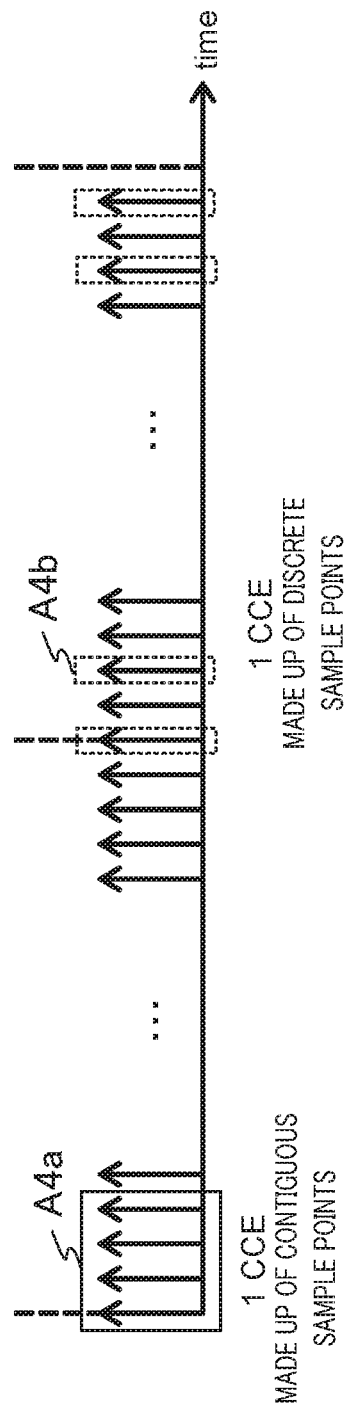
FIG. 4 illustrates a mapping example of the DL control signal according to Modification 1 of Embodiment 1.

FIG. 4 illustrates a mapping example of the DL control signal according to Modification 1 of Embodiment 1. The DL control signal is mapped to the sample points in units of, for example, CCEs each including 36 sample points.

For example, the DL control signal is obtained by encoding and modulating 20 DCI bits. Examples of the modulation scheme for modulating the DCI bits include BPSK (binary phase-shift keying), $\pi/2$-shift BPSK, QPSK, and $\pi/4$-shift QPSK.

The number of bits after encoding the DCI bits is "72 bits". This is modulated by QPSK, and the DCI is indicated by "36 symbols". In this case, the DL control signal (DCI) is mapped in 1 CCE including 36 sample points and transmitted to user terminal 20.

Frame A4a shown in FIG. 4 indicates 1 CCE. Although FIG. 4 shows only 4 sample points in frame A4a due to limitations of space, there are actually 36 sample points in frame A4a.

As indicated by frame A4a of FIG. 4, 1 CCE may include contiguous sample points. As indicated by dotted frames A4b in FIG. 4, 1 CCE may include discrete sample points. When 1 CCE includes discrete sample points, 1 CCE may be made up of, for example, every other sample points or every three or more sample points.

Note that the DL control signal may be mapped to two or more CCEs and transmitted to user terminal 20.

In this way, the DL control signal is mapped to the sample points of the single carrier in units of CCEs. According to the processing, a new configuration suitable for the single carrier is provided in the downlink control signal of the radio communication system of the future.

The CCE includes contiguous sample points, and the radio communication system can simplify the mapping processing of the DL control signal. The radio communication system can also reduce the delay in the mapping processing of the DL control signal.

As indicated by dotted frames A4b in FIG. 4, the CCE may include discrete sample points. According to the configuration, the radio communication system can obtain time diversity of the DL control signal.

Although FIG. 4 illustrates only one CCE in 1 symbol as indicated by frame A4a, a plurality of CCEs may be included in 1 symbol. One or two or more CCEs may be assigned to each of a plurality of users.

[Modification 2 of Embodiment 1]

In Modification 2 of Embodiment 1, a modification of the CCE including discrete sample points described in Modification 1 of Embodiment 1 will be described.

Figure 5:
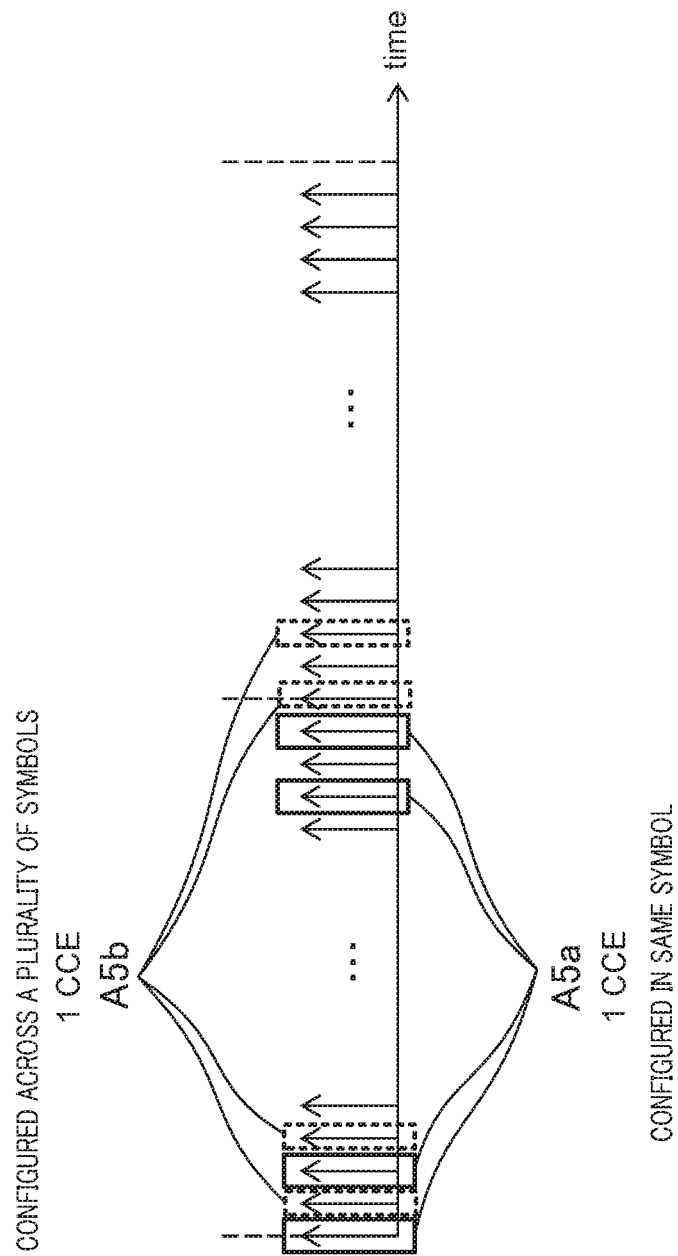
FIG. 5 illustrates a mapping example of the DL control signal according to Modification 2 of Embodiment 1.

FIG. 5 illustrates a mapping example of the DL control signal according to Modification 2 of Embodiment 1. Frames A5a shown in FIG. 5 indicate 1 CCE including discrete sample points. 1 CCE indicated by frames A5a includes discrete sample points in 1 symbol.

Dotted frames A5b shown in FIG. 5 indicate 1 CCE including discrete sample points. 1 CCE indicated by dotted frames A5b includes discrete sample points across a plurality of symbols compared to 1 CCE indicated by frames A5a.

In this way, the CCE including discrete sample points may be configured in 1 symbol. According to the configuration, the radio communication system can reduce the delay in the mapping processing of the DL control signal.

The CCE including discrete sample points may be configured across a plurality of symbols. According to the configuration, the radio communication system can obtain time diversity of the DL control signal.

[Modification 3 of Embodiment 1]

In Modification 3 of Embodiment 1, a modification of the CCE including discrete sample points described in Modification 1 of Embodiment 1 will be described.

Figure 6:
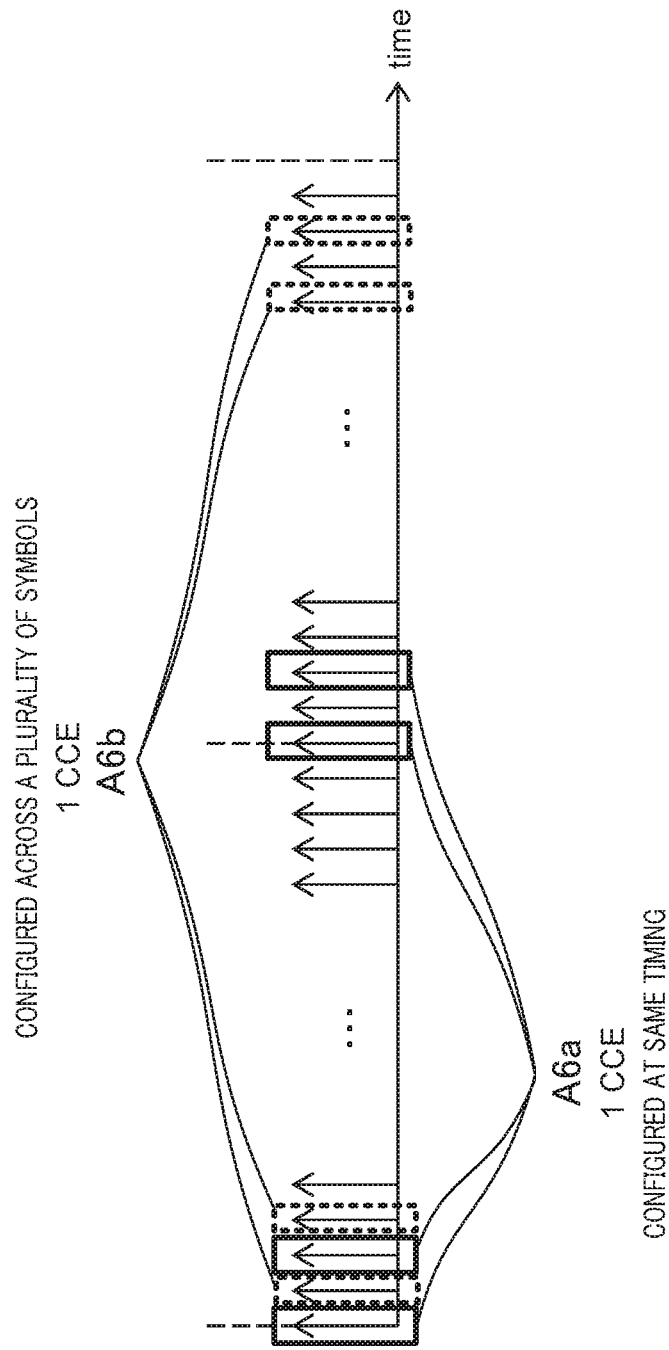
FIG. 6 illustrates a mapping example of the DL control signal according to Modification 3 of Embodiment 1.

FIG. 6 illustrates a mapping example of the DL control signal according to Modification 3 of Embodiment 1. Frames A6a shown in FIG. 6 indicate 1 CCE including discrete sample points. 1 CCE indicated by frames A6a includes discrete sample points across a plurality of symbols. 1 CCE indicated by frames A6a includes sample points of the same timing in each symbol. For example, 1 CCE indicated by frames A6a includes odd-numbered sample points from the top in each symbol. More specifically, 1 CCE indicated by frames A6a includes a first sample point, a third sample point, a fifth sample point, . . . of a symbol and includes a first sample point, a third sample point, a fifth sample point, . . . of the next symbol.

Dotted frames A6b shown in FIG. 6 indicate 1 CCE including discrete sample points. 1 CCE indicated by dotted frames A6b include discrete sample points across a plurality of symbols. 1 CCE indicated by dotted frames A6b includes sample points of different timings in each symbol. For example, 1 CCE indicated by dotted frames A6b includes a second sample point, a fourth sample, a sixth sample point, . . . , and a k-th sample point of a symbol and includes sample points other than a second sample point, a fourth sample point, a sixth sample point, . . . , and a k-th sample point of the next symbol.

In this way, the CCE including discrete sample points may be configured across a plurality of symbols and made up of sample points of the same timing in each symbol. According to the configuration, the radio communication system can simplify the mapping processing of the DL control signal.

The CCE including discrete sample points may be configured across a plurality of symbols and made up of sample points of different timings in each symbol. According to the configuration, the radio communication system can flexibly configure the CCE. The radio communication system can also flexibly map the DL control signal.

[Modification 4 of Embodiment 1]

In a case described in Modification 4 of Embodiment 1, a CCE aggregation level (aggregation level) is 2 or higher.

Figure 7:
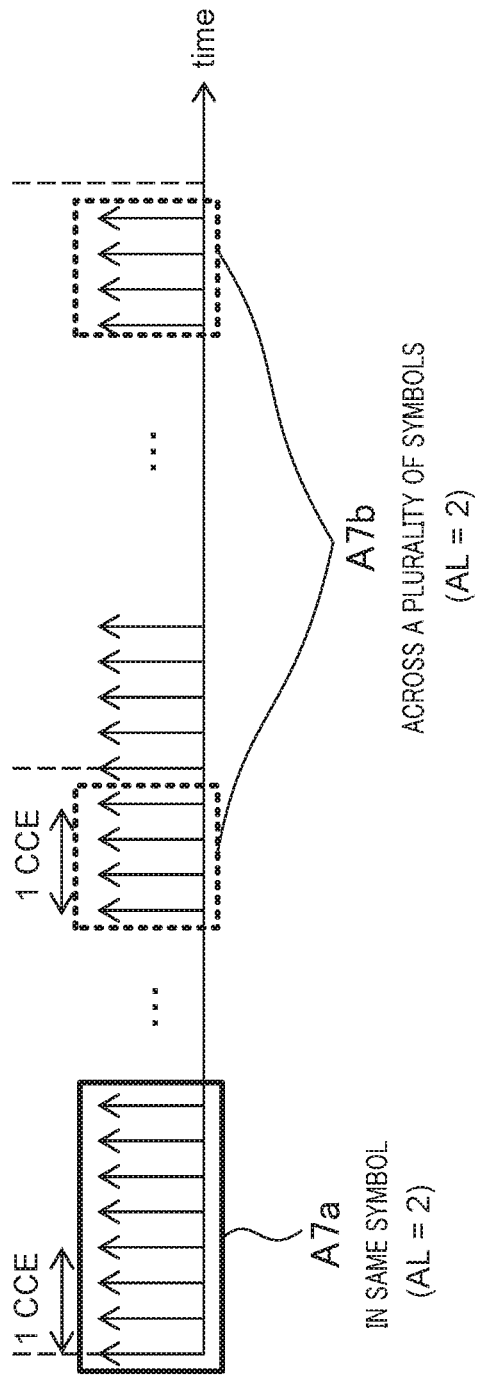
FIG. 7 illustrates a mapping example of the DL control signal according to Modification 4 of Embodiment 1.

FIG. 7 illustrates a mapping example of the DL control signal according to Modification 4 of Embodiment 1. Frame A7a shown in FIG. 7 indicates a CCE in CCE aggregation level "2" (AL=2). The CCE in CCE aggregation level "2" includes, for example, 72 sample points (sample points equivalent to two CCEs). Although FIG. 7 illustrates only 8 sample points in frame A7a due to limitations of space, there are actually 72 samples points in frame A7a. The CCE in CCE aggregation level "2" may include sample points in 1 symbol as indicated by frame A7a of FIG. 7.

Dotted frames A7b shown in FIG. 7 also indicate a CCE in CCE aggregation level "2." Although FIG. 7 illustrates only 8 sample points in dotted frames A7b due to limitations of space, there are actually 72 sample points in dotted frames A7b. The CCE in CCE aggregation level "2" may include sample points of different symbols as indicated by dotted frames A7b in FIG. 7.

Although the CCE aggregation level is "2" in the case described above, the same applies when the CCE aggregation level is "3" or "4". For example, the CCE in CCE aggregation level "3" or "4" may include sample points in 1 symbol or may include sample points of different symbols as described above.

Although the sample points included in the CCE are contiguous in the description above, the sample points may be discrete. For example, the CCE in CCE aggregation level "2" to "4" may include discrete sample points and may include the discrete sample points in 1 symbol or in different symbols.

In this way, the CCE in aggregation level "2" or higher may include sample points in 1 symbol. According to the configuration, the radio communication system can reduce the delay in the mapping processing of the DL control signal. The radio communication system can also simplify the mapping processing of the DL control signal.

The CCE in aggregation level "2" or higher may include sample points of different symbols. According to the configuration, the radio communication system can flexibly configure the CCE.

[Modification 5 of Embodiment 1]

In Modification 5 of Embodiment 1, the DL control signal is transmitted in a first time region in the symbol, and the DL control signal is not transmitted in a second time region other than the first time region.

Figure 8A:
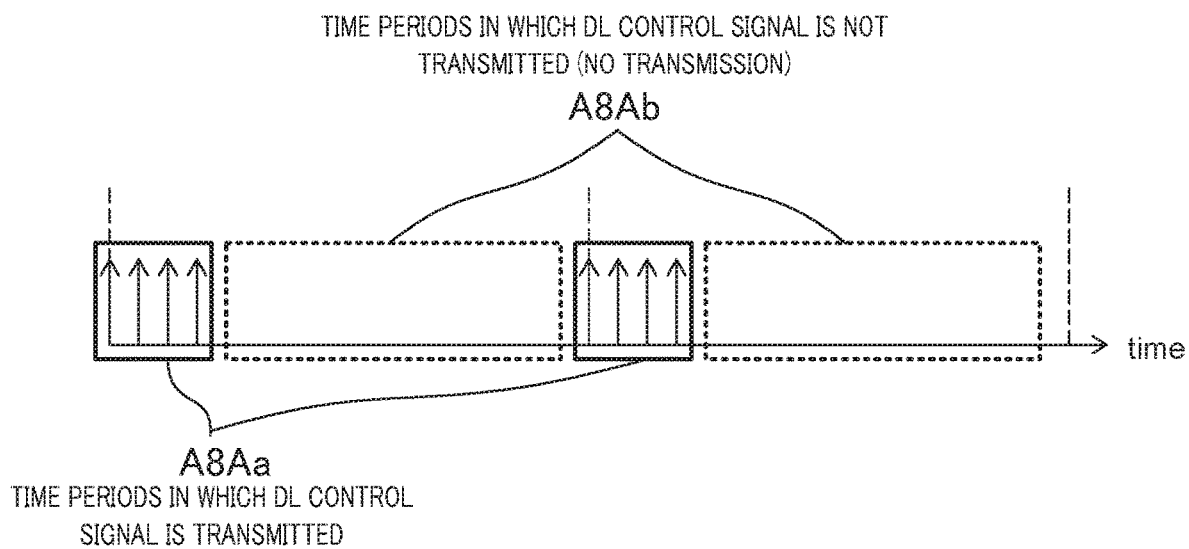
FIG. 8A illustrates a mapping example of the DL control signal according to Modification 5 of Embodiment 1.
Figure 8B:
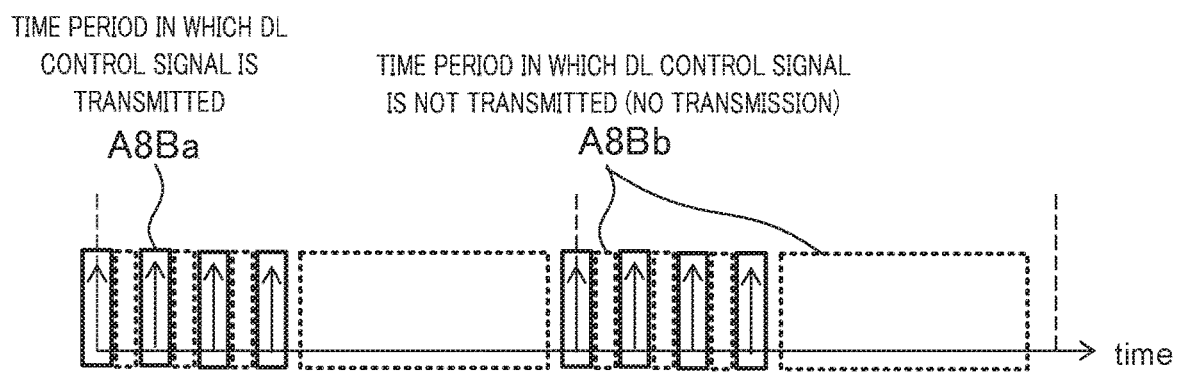
FIG. 8B illustrates a mapping example of the DL control signal according to Modification 5 of Embodiment 1.

FIGS. 8A and 8B illustrate mapping examples of the DL control signal according to Modification 5 of Embodiment 1. The symbol is divided into a time region in which the DL control signal is transmitted and a time region in which the DL control signal is not transmitted.

Frames A8Aa shown in FIG. 8A indicate time regions of symbols in which the DL control signal is transmitted. Dotted frames A8Ab shown in FIG. 8A indicate time regions of symbols in which the DL control signal is not transmitted. In the example of FIG. 8A, the DL control signal is mapped to contiguous sample points as indicated by frames A8Aa.

On the other hand, in the example of FIG. 8B, the DL control signal is mapped to discrete sample points as indicated by frames A8Ba, unlike in the example of FIG. 8A. As indicated by dotted frames A8Bb, collective time regions in which the DL control signal is not transmitted are provided in the symbols.

In this way, the symbol may include the first time region in which the downlink control signal is mapped to sample points and the second time region in which the downlink control signal is not mapped to the sample points. According to the processing, the radio communication system can coordinate the inter-cell interference of the DL control signal. The radio communication system can also coordinate the inter-symbol interference of the DL control signal.

[Modification 6 of Embodiment 1]

Coordination of the DL control signals between cells will be described in Modification 6 of Embodiment 1.

Figure 9:
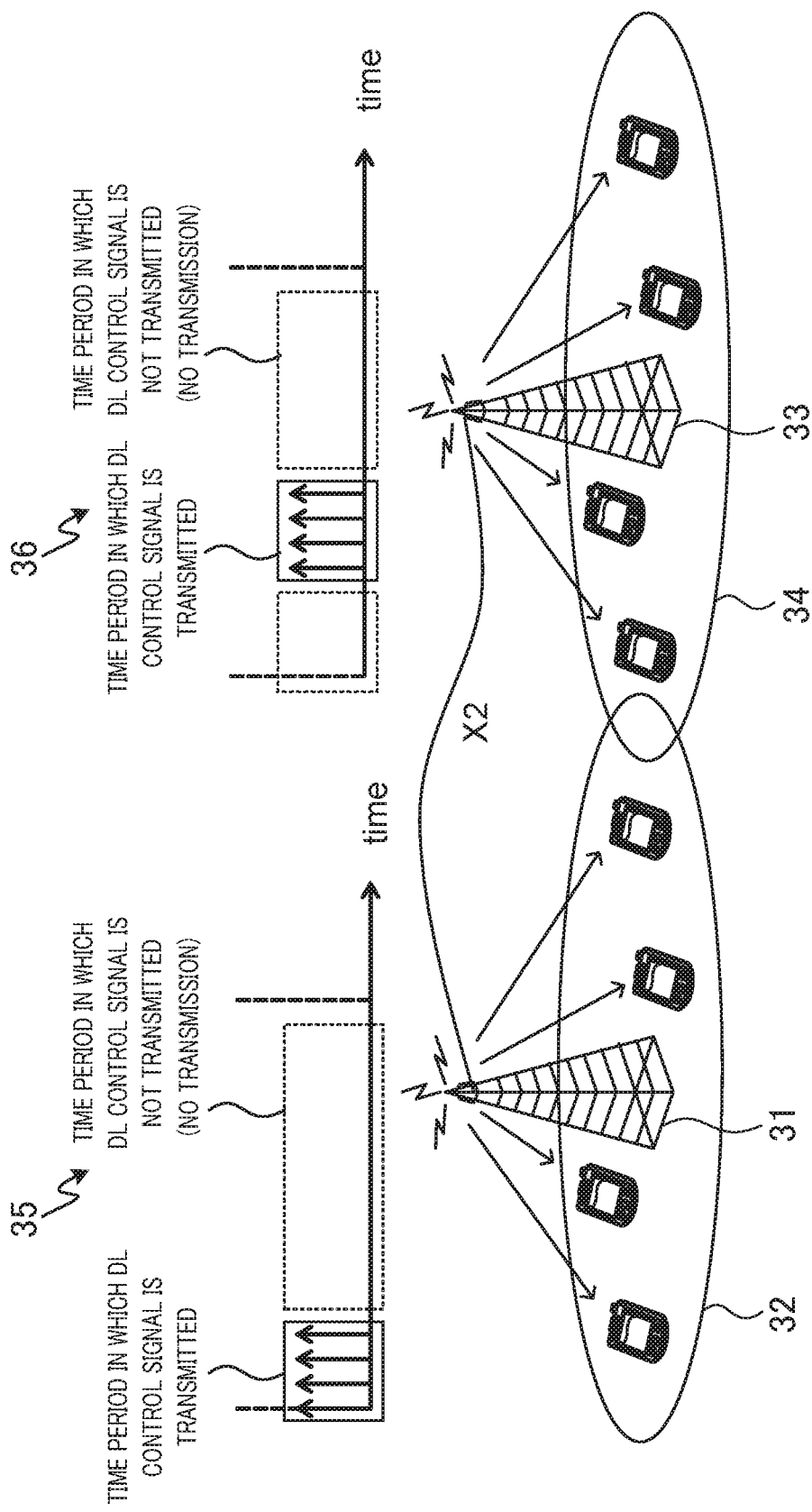
FIG. 9 illustrates a mapping example of the DL control signal according to Modification 6 of Embodiment 1.

FIG. 9 illustrates a mapping example of the DL control signals according to Modification 6 of Embodiment 1. FIG. 9 illustrates radio base station 31, cell 32 formed by radio base station 31, radio base station 33, and cell 34 formed by radio base station 33. FIG. 9 also illustrates radio resources 35 of radio base station 31 and radio resources 36 of radio base station 33. As indicated by radio resources 35 and 36, the symbol includes a time region to which DL control signal is mapped and a time region to which the DL control signal is mapped.

Radio base stations 31 and 33 coordinate the transmission time of the DL control signals to avoid a collision of the DL control signals between cells 32 and 34. For example, radio base stations 31 and 33 shift the assignment time of the DL control signals to the sample points as indicated by radio resources 35 and 36 to prevent the transmission time of the DL control signals from overlapping.

Radio base stations 31 and 33 use an X2 interface to exchange the mapping time of the DL control signals on the sample points. Alternatively, radio base stations 31 and 33 may shift the transmission time of the DL control signals based on cell IDs.

Radio base stations 31 and 33 use, for example, MIB/SIB (Master Information Block/System Information Block), message 2, paging information, RRC (Radio Resource Control) connection configuration, or SI connection configuration to notify the user terminals under control of the assignment time of the DL control signals.

In this way, the DL control signals are mapped to sample points in different time regions in adjacent radio base stations 31 and 33. According to the processing, the radio communication system can prevent a collision of DL control signals.

[Modification 7 of Embodiment 1]

Repetitive transmission of the DL control signal will be described in Modification 7 of Embodiment 1.

Figure 10:
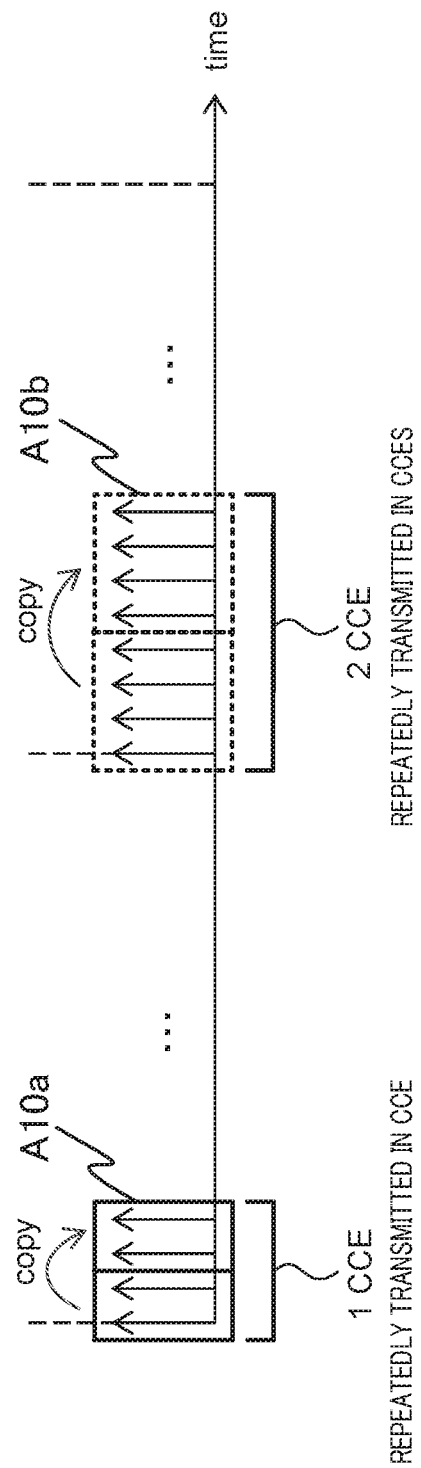
FIG. 10 illustrates a mapping example of the DL control signal according to Modification 7 of Embodiment 1.

FIG. 10 illustrates a mapping example of the DL control signal according to Modification 7 of Embodiment 1. Frames A10a shown in FIG. 10 indicate an example in which the DL control signal is repeated (copied) in 1 CCE. Although frames A10a indicate only 4 sample points due to limitations of space, 1 CCE includes, for example, 36 sample points.

For example, the number of bits after encoding the DCI bits is "36 bits." When this is modulated by QPSK, the DCI is indicated by "18 symbols." When the DCI with "18 symbols" is repeated in 1 CCE, there are "36 symbols." Frames A10a illustrate an example in which the DCI with "36 symbols" is mapped in 1 CCE. Therefore, the DL control signal is repeated in 1 CCE and transmitted to user terminal 20.

Dotted frames A10b shown in FIG. 10 illustrate an example in which the DL control signal is repeated (copied) between CCEs. Although only 8 sample points are illustrated in dotted frames A10b due to limitations of space, 2CCE includes, for example, 72 sample points.

For example, the number of bits after encoding the DCI bits is "72 bits." When this is modulated by QPSK, the DCI is indicated by "36 symbols." When the DCI with "36 symbols" is repeated between CCEs, there are "72 symbols." Dotted frames A10b illustrate an example in which the DCI with "72 symbols" is mapped in 2 CCEs. Therefore, the DL control signal is repeated between the CCEs and transmitted to user terminal 20.

In this way, the DL control signal may be repeatedly mapped in the CCE. According to the processing, the radio communication system can increase the reception SN based on composition of the DL control signal.

The DL control signal may also be repeatedly mapped between CCEs. According to the processing, the radio communication system can increase the reception SN based on the composition of the DL control signal.

[Modification 8 of Embodiment 1]

In a case described in Modification 8 of Embodiment 1, the DL control signals of a plurality of subframes are collectively transmitted in one subframe.

Figure 11:
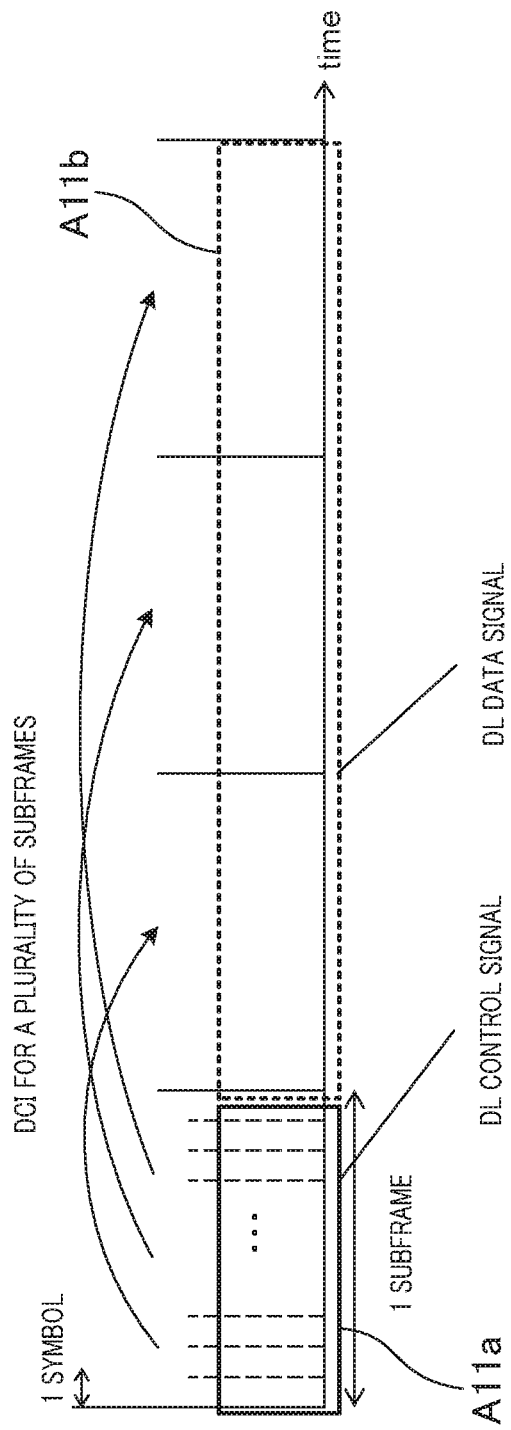
FIG. 11 illustrates a mapping example of the DL control signal according to Modification 8 of Embodiment 1.

FIG. 11 illustrates a mapping example of the DL control signals according to Modification 8 of Embodiment 1. Frame A11a shown in FIG. 11 indicates a subframe in which the DL control signals are mapped. Dotted frame A11b indicates subframes in which the DL data signals are mapped. The subframes in which the DL data signals am mapped indicated by dotted frame A11b follow the subframe in which the DL controls signals are mapped indicated by frame A11a.

The DL control signals of the subframes in which the DL data signals are mapped are collectively mapped in the subframe in which the DL control signals are mapped. Therefore, the DL control signals of the DL data signals of a plurality of subframes indicated by dotted frame A11b are collectively mapped in the subframe indicated by frame A11a.

The DL control signal of a first subframe indicated by dotted frame A11b is mapped to, for example, first to (n)th symbols of the subframe indicated by frame A11a. The DL control signal of a second subframe indicated by dotted frame A11b is mapped to, for example, (n+1)th to (2n)th symbols of the subframe indicated by frame A11a. The DL control signal of a third subframe indicated by dotted frame A11b is mapped to, for example, (2n+1)th to (3n)th symbols of the subframe indicated by frame A11a. Similarly, the DL control signal of an (m)th subframe indicated by dotted frame A11b is mapped to, for example, ((nm−1)+1)th to (nm)th symbols of the subframe indicated by frame A11a. Therefore, the DL control signals of the DL data signals mapped in the subframes of dotted frame A11b are associated with the mapping position of the subframe indicated by frame A11a.

In this way, the DL control signals of the DL data signals for a plurality of subframes are mapped in a specific subframe. According to the processing, the radio communication system can effectively transmit the DL control signals even when a sufficiently long time is necessary for transmission of one DL control signal such as when the delay spread is large.

Embodiment 2

Hereinafter, Embodiment 2 will be described with reference to the accompanying drawings. The DL control signal is mapped in contiguous frequency regions (frequency bands) in Embodiment 2.

Figure 12:
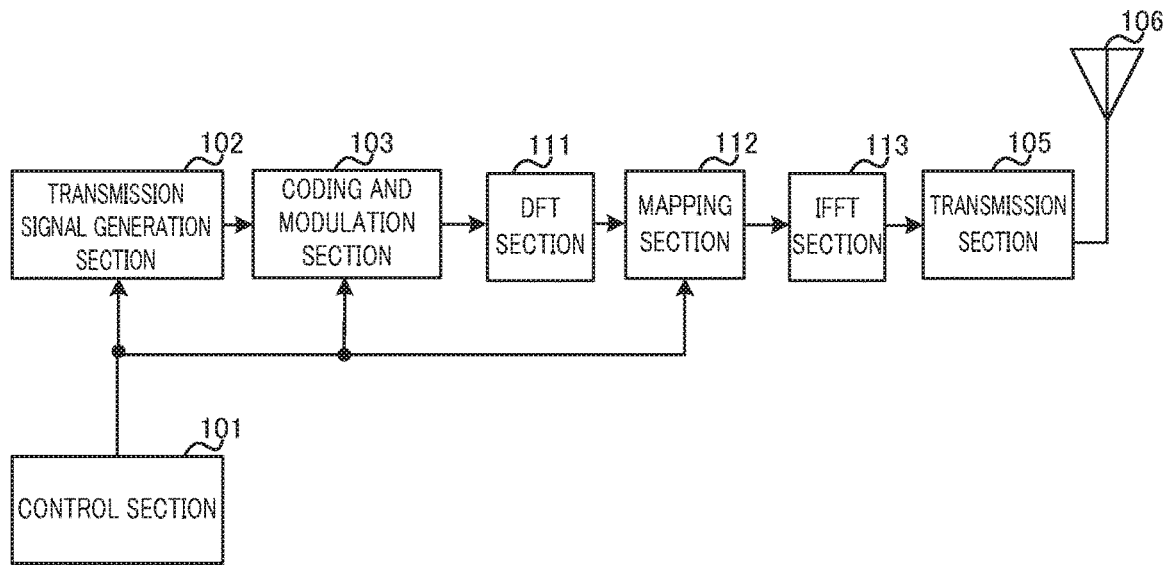
FIG. 12 illustrates a configuration example of functional blocks of the radio base station according to Embodiment 2.

FIG. 12 illustrates a configuration example of functional blocks of the radio base station according to Embodiment 2. In FIG. 12, the same reference signs are provided to the same functional blocks as in FIG. 1. Parts different from FIG. 1 will be described below.

As shown in FIG. 12, radio base station 10 includes DFT section 111, mapping section 112, and IFFT (Inverse Fast Fourier Transform) section 113.

DFT section 111 uses DFT to convert a DL signal output from coding and modulation section 103 into a signal in frequency regions. Mapping section 112 maps the DL signal converted into the frequency regions by DFT section 111 on subcarriers. Mapping section 112 maps the DL signal on contiguous subcarriers to maintain the low PAPR of DFT Spread OFDM.

IFFT section 113 converts the DL signal in a plurality of frequency regions mapped to the contiguous subcarriers into a signal in time regions. Therefore, radio base station 10 performs DFT Spread OFDM of the DL signal.

Figure 13:
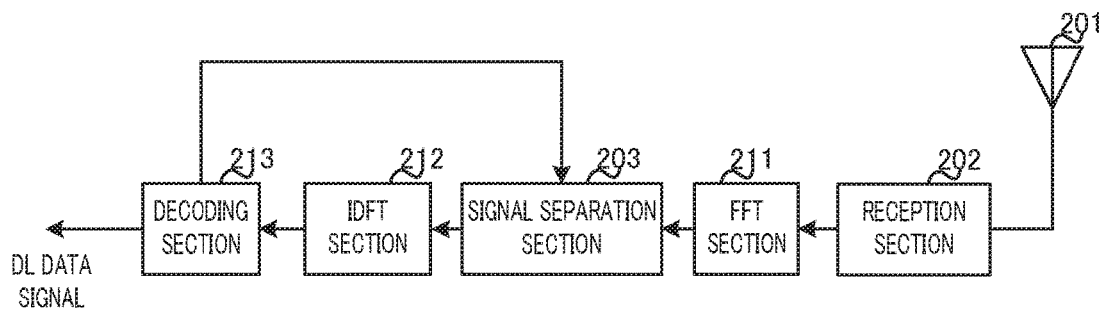
FIG. 13 illustrates a configuration example of functional blocks of the user terminal according to Embodiment 2.

FIG. 13 illustrates a configuration example of functional blocks of the user terminal according to Embodiment 2. In FIG. 13, the same reference signals are provided to the same functional blocks as in FIG. 2. Parts different from FIG. 2 will be described below.

As shown in FIG. 13, user terminal 20 includes FFT section 211, IDFT (Inverse DFIT) section 212, and decoding section 213.

FFT section 211 uses FFT to convert a DL signal output from reception section 202 into a signal in frequency regions. FFT section 211 demaps the signal in the frequency regions from subcarriers and outputs the signal to signal separation section 203.

IDFT section 212 uses IDFT to convert the DL control signal and the DL data signal in the frequency regions separated by signal separation section 203 into signals in time regions. Decoding section 213 decodes the DL control signal and the DL data signal converted into the time regions. Decoding section 213 outputs the scheduling information and the like included in the DL control signal for user terminal 20 to signal separation section 203.

Figure 14:
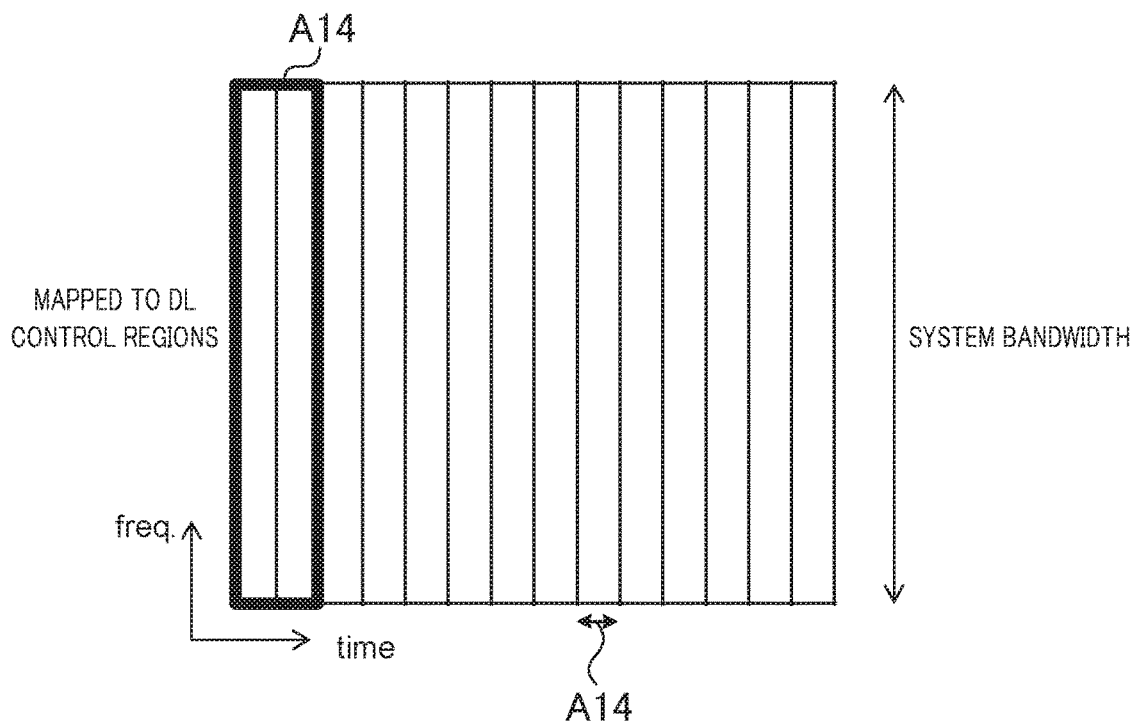
FIG. 14 illustrates a mapping example of the DL control signal according to Embodiment 2.

FIG. 14 illustrates a mapping example of the DL control signal according to Embodiment 2. The horizontal axis shown in FIG. 14 indicates the time axis. The vertical axis indicates the frequency. Double-headed arrow A14 in the time direction shown in FIG. 14 indicates 1 symbol interval.

Frame A14 shown in FIG. 14 indicates radio resources to which the DL control signal can be mapped. The DL control signal is mapped to contiguous subcarriers (frequency regions) in frame A14.

In this way, the DL control signal may be mapped to contiguous subcarriers. According to the processing, the radio communication system can reduce the PAPR of the power amplifier in the downlink.

Modification 1 of Embodiment 2

Multiplexing of the DL control signals in the frequency regions will be described in Modification 1 of Embodiment 2.

Figure 15:
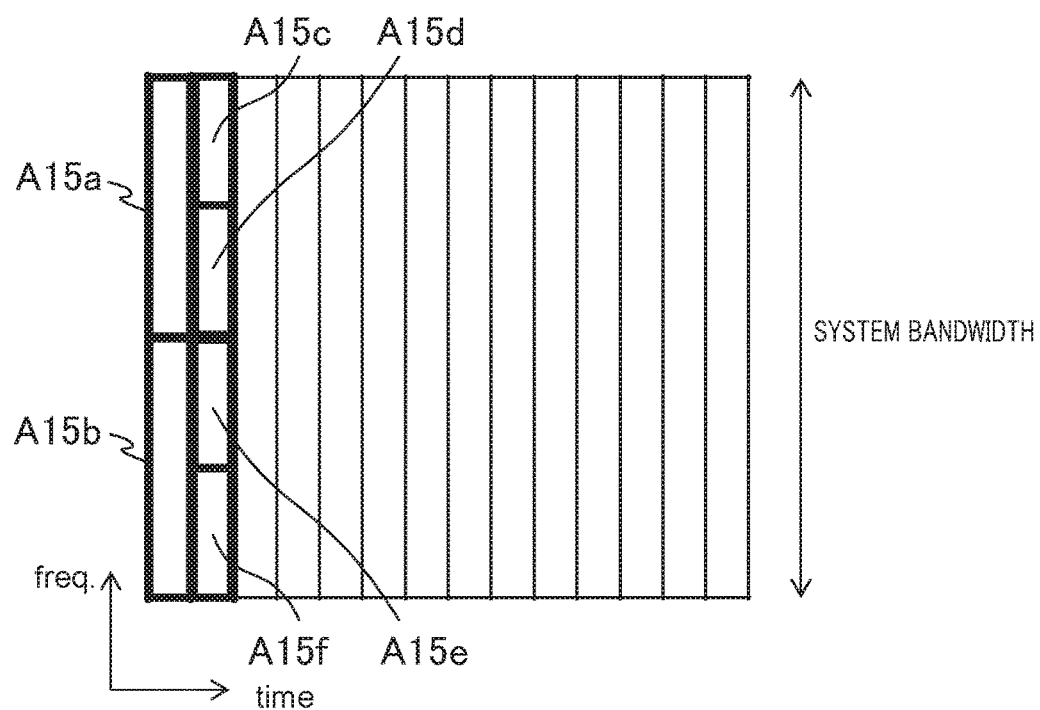
FIG. 15 illustrates a mapping example of the DL control signal according to Modification 1 of Embodiment 2.

FIG. 15 illustrates a mapping example of the DL control signals according to Modification 1 of Embodiment 2. Frames A15a and A15b shown in FIG. 15 indicate the DL control signals mapped in the frequency direction of 1 symbol region. The DL control signals shown in frames A15a and A15b indicate DL control signals of different user terminals. Therefore, frames A15a and A15b illustrate an example in which the DL control signals of two different user terminals are mapped in the frequency direction of 1 symbol region.

Frames A15c to A15f shown in FIG. 15 indicate the DL control signals mapped in the frequency direction of 1 symbol region. The DL control signals shown in frames A15c to A15f indicate DL control signals of different user terminals. Therefore, frames A15c to A15f illustrate an example in which the DL control signals of four different user terminals are mapped in the frequency direction of 1 symbol region.

One collective frequency region is assigned to each of the multiplexed DL control signals. Therefore, the frequency is contiguously assigned to the DL control signal of one user terminal. In other words, the DL control signal of one user terminal is not mapped to the radio resources in separate frequencies.

Note that the PAPR of the signals wirelessly transmitted to the user terminal increases with an increase in the number of DL control signals multiplexed in the frequency direction. Therefore, an upper limit may be set for the number of multiplexed DL control signals.

Alternatively, the modulation scheme of the DL control signals may be set according to the number of multiplexed DL control signals. For example, the DL control signals may be modulated by QPSK when the DL control signals of two user terminals are multiplexed, and the DL control signals may be modulated by BPSK when the DL control signals of four user terminals are multiplexed.

Alternatively, the number of multiplexed DL control signals may be set according to the reception quality of the DL control signals. For example, a larger number of multiplexed DL control signals may set for higher reception quality of the DL control signals. Alternatively, the number of multiplexed DL control signals may be set according to the transmission power of the downlink. For example, a smaller number of multiplexed DL control signals may be set for larger transmission power.

In this way, a contiguous frequency may be assigned to each of a plurality of DL control signals, and the DL control signals may be multiplexed and mapped in the frequency direction. According to the processing, the radio communication system can reduce the PAPR of the power amplifier in the downlink.

[Modification 2 of Embodiment 2]

A configuration of the CCE will be described in Modification 2 of Embodiment 2.

Figure 16:
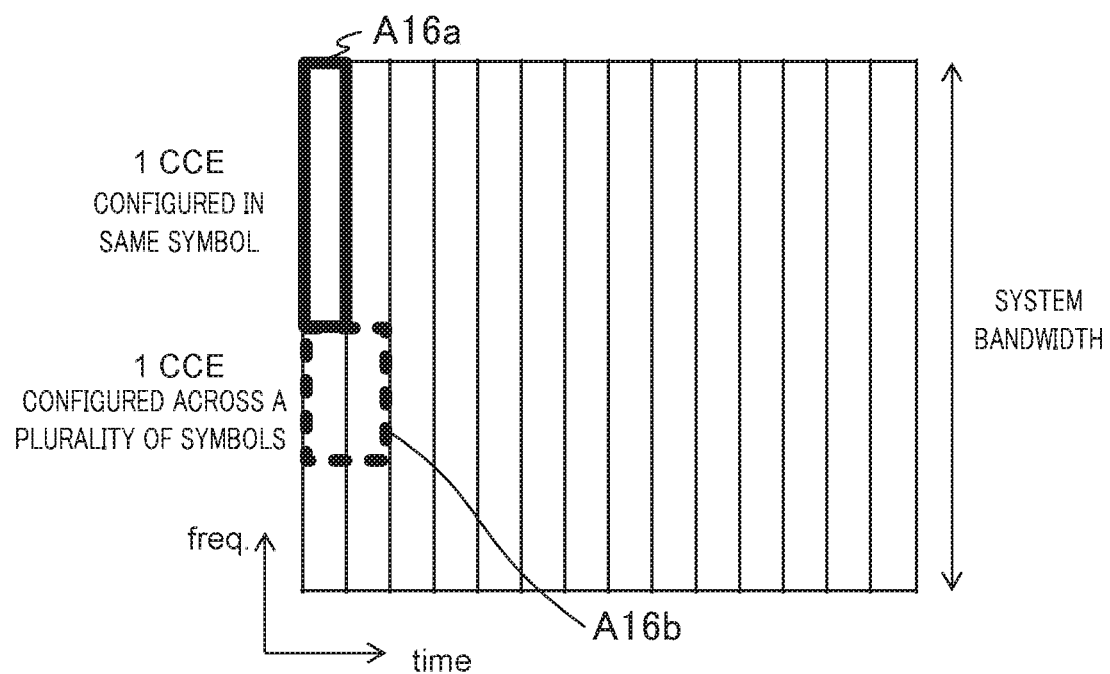
FIG. 16 illustrates a mapping example of the DL control signal according to Modification 2 of Embodiment 2.

FIG. 16 illustrates a mapping example of the DL control signal according to Modification 2 of Embodiment 2. Frame A16a shown in FIG. 16 illustrates an example of 1 CCE configured in the frequency direction of 1 symbol. As indicated by frame A16a, the CCE may be configured in the frequency direction of 1 symbol.

Dotted frame A16b illustrates an example of 1 CCE configured in the frequency direction of 2 consecutive symbols. As indicated by dotted frame A16b, the CCE may be configured in the frequency direction of a plurality of symbols.

In this way, the CCE may be configured in the frequency direction of 1 symbol. According to the configuration, the radio communication system can reduce the delay in the mapping processing of the DL control signal.

The CCE may be configured in the frequency direction across a plurality of symbols. According to the configuration, the radio communication system can obtain time diversity of the DL control signal.

[Modification 3 of Embodiment 2]

In Modification 3 of Embodiment 2, a modification of the CCE configured across a plurality of symbols described in Modification 2 of Embodiment 2 will be described.

Figure 17:
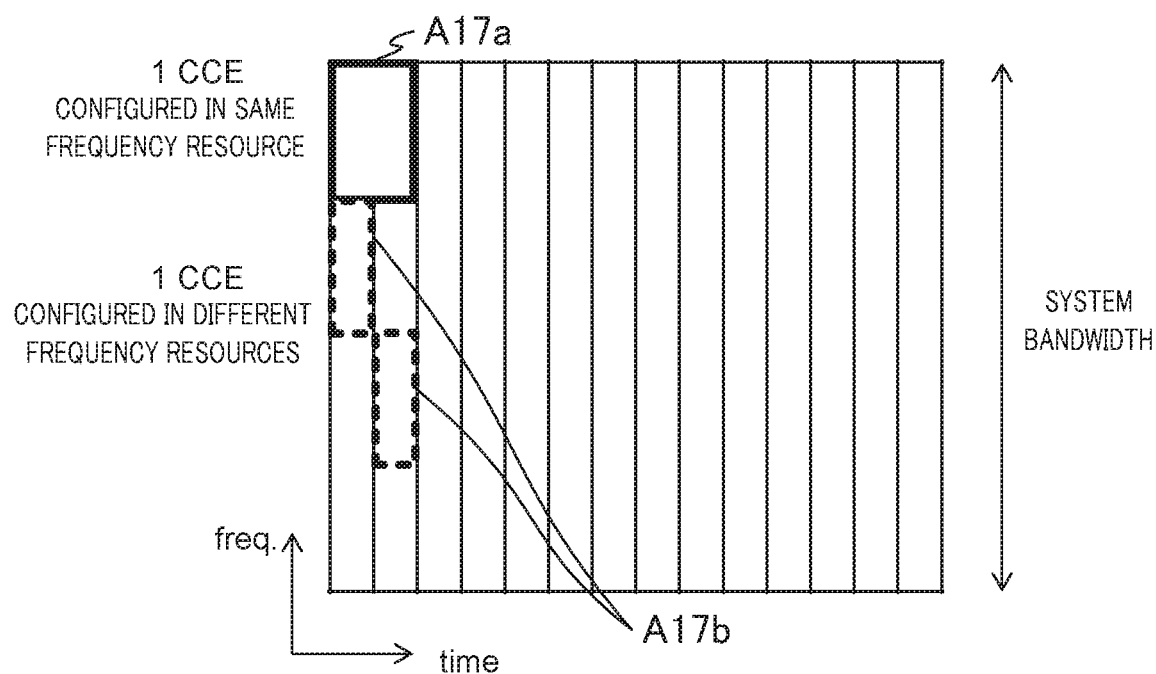
FIG. 17 illustrates a mapping example of the DL control signal according to Modification 3 of Embodiment 2.

FIG. 17 illustrates a mapping example of the DL control signal according to Modification 3 of Embodiment 2. Frame 17a illustrates an example of 1 CCE configured in the frequency region of 2 contiguous symbols. As indicated by frame A17a, the CCE may be configured in the same frequency region of 2 contiguous symbols.

Dotted frames A17b illustrate an example of 1 CCE configured in different frequency regions of 2 contiguous symbols. As indicated by dotted frames A17b, the CCE may be configured in different frequency regions of 2 contiguous symbols. Therefore, the CCE may be configured in 2 contiguous symbols without overlapping of the frequency regions.

In this way, the CCE may be configured in different frequency regions in a plurality of symbols without overlapping of the frequency regions. According to the configuration, the radio communication system can flexibly configure the CCE. The radio communication system can also flexibly map the DL control signal. The radio communication system can also flexibly schedule the DL control signal.

[Modification 4 of Embodiment 2]

The CCE aggregation level (aggregation level) is 2 or higher in a case described in Modification 4 of Embodiment 2.

Figure 18:
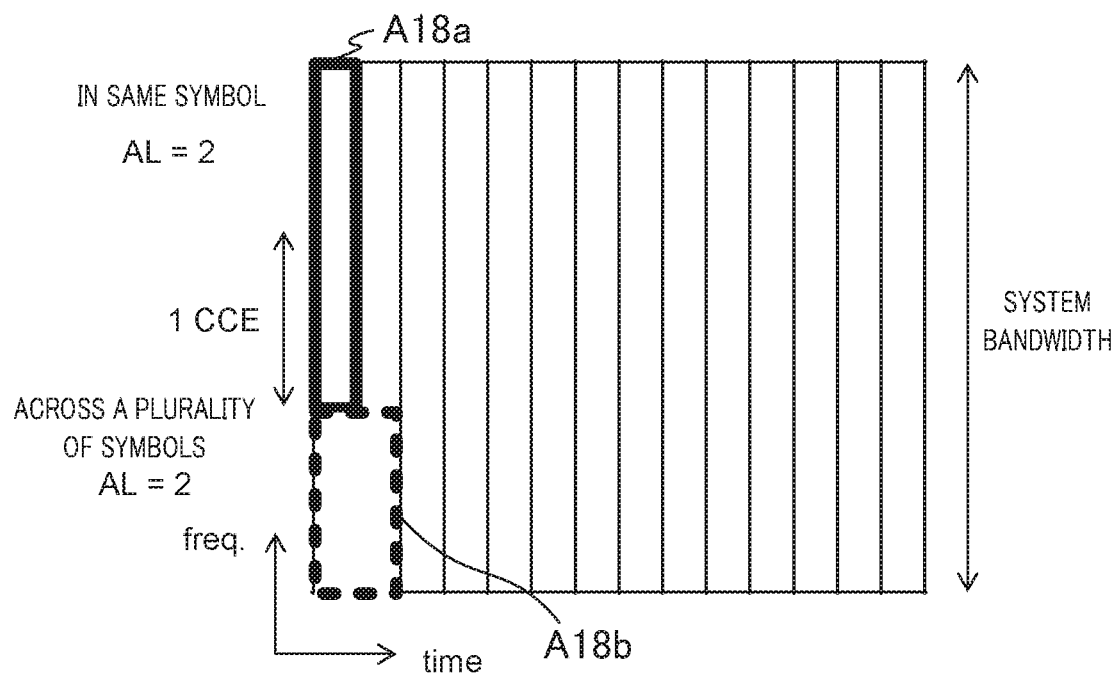
FIG. 18 illustrates a mapping example of the DL control signal according to Modification 4 of Embodiment 2.

FIG. 18 illustrates a mapping example of the DL control signal according to Modification 4 of Embodiment 2. Frame A18a shown in FIG. 18 indicates the CCE in CCE aggregation level "2" (AL=2). The CCE in CCE aggregation level "2" may be configured in 1 symbol as indicated by frame A18a.

Dotted frame A18b shown in FIG. 18 indicates the CCE in CCE aggregation level "2." The CCE in CCE aggregation level "2" may be configured in the same frequency region of 2 contiguous symbols as indicated by dotted frame A18b.

Although the CCE aggregation level is "2" in the case described above, the same applies when the CCE aggregation level is "3" or "4." For example, the CCE in CCE aggregation level "3" or "4" may be configured in 1 symbol as described above. The CCE in CCE aggregation level "3" or "4" may be configured in the same frequency region across a plurality of symbols.

In this way, the CCE in aggregation level "2" or higher may be configured in 1 symbol. According to the configuration, the radio communication system can simplify the mapping processing of the DL control signal. The radio communication system can also reduce the delay in the disposition processing of the DL control signal.

The CCE in aggregation level "2" or higher may be configured in the same frequency region across different symbols. According to the configuration, the radio communication system can obtain time diversity of the DL control signal.

[Modification 5 of Embodiment 2]

In a case described in Modification 5 of Embodiment 2, the CCE aggregation level (aggregation level) is 2 or higher, and the CCE is configured in different frequency regions.

Figure 19:
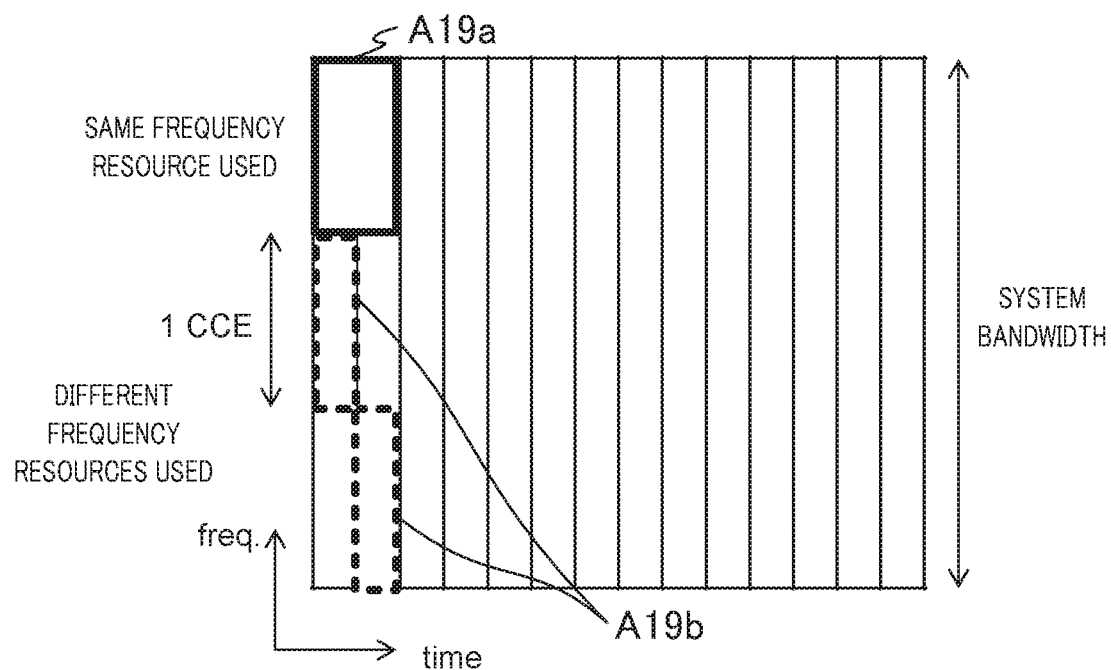
FIG. 19 illustrates a mapping example of the DL control signal according to Modification 5 of Embodiment 2.

FIG. 19 illustrates a mapping example of the DL control signal according to Modification 5 of Embodiment 2. Frame A19a shown in FIG. 19 indicates the CCE in CCE aggregation level "2". As indicated by frame A19a, the CCE in CCE aggregation level "2" may be configured in the same frequency region of 2 contiguous symbols.

Dotted frames A19b illustrate an example in which the CCE in CCE aggregation level "2" is configured in different frequency regions of 2 contiguous symbols. As indicated by dotted frames A19b, the CCE may be configured in different frequency regions of 2 contiguous symbols. Therefore, the CCE may be configured in 2 contiguous symbols without overlapping of the frequency regions.

Although the CCE aggregation level is "2" in the case described above, the same applies when the CCE aggregation level is "3" or "4." For example, the CCE in CCE aggregation level "3" or "4" may also be configured in different frequency regions across a plurality of contiguous symbols as described above.

In this way, the CCE in aggregation level "2" or higher may be configured in different frequency regions without overlapping of the frequency regions in a plurality of contiguous symbols. According to the processing, the radio communication system can flexibly configure the CCE. The radio communication system can also flexibly map the DL control signal. The radio communication system can also flexibly schedule the DL control signal.

Note that a hopping pattern may be used for the resource pattern of the DL control signal.

[Modification 6 of Embodiment 2]

In Modification 6 of Embodiment 2, the DL control signal is transmitted in a first frequency region in the symbol, and the DL control signal is not transmitted in a second frequency region other than the first frequency region.

Figure 20:
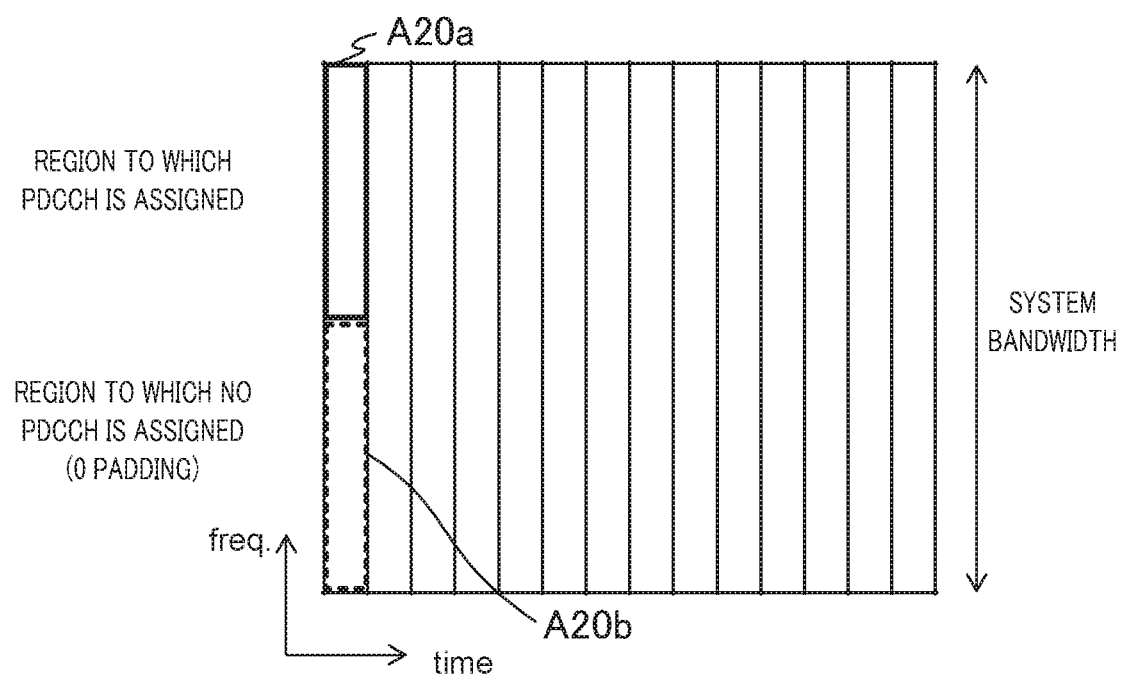
FIG. 20 illustrates a mapping example of the DL control signal according to Modification 6 of Embodiment 2.

FIG. 20 illustrates a mapping example of the DL control signal according to Modification 6 of Embodiment 2. The frequency regions of the radio resources are divided into a frequency region to which the DL control signal is mapped and a frequency region to which the DL control signal is not mapped. For example, frame A20a shown in FIG. 20 indicates the frequency region to which the DL control signal is not mapped. Dotted frame A20b shown in FIG. 20 indicates the frequency region to which the DL control signal is not mapped. Zero padding is applied to the frequency region to which the DL control signal is not mapped, for example.

In this way, the radio resources may include the first frequency region to which the DL control signal is mapped and the second frequency region to which the DL control signal is not mapped. According to the processing, the radio communication system can coordinate the inter-cell interference of the DL control signal. The radio communication system can also reduce the number of multiplexed user terminals to reduce the PAPR.

Note that radio base station 10 may apply power boosting. For example, radio base station 10 may assign the power assigned to the region of dotted frame A20b to the region of frame A20a.

[Modification 7 of Embodiment 2]

Coordination of the DL control signals between cells will be described in Modification 7 of Embodiment 2.

Figure 21:
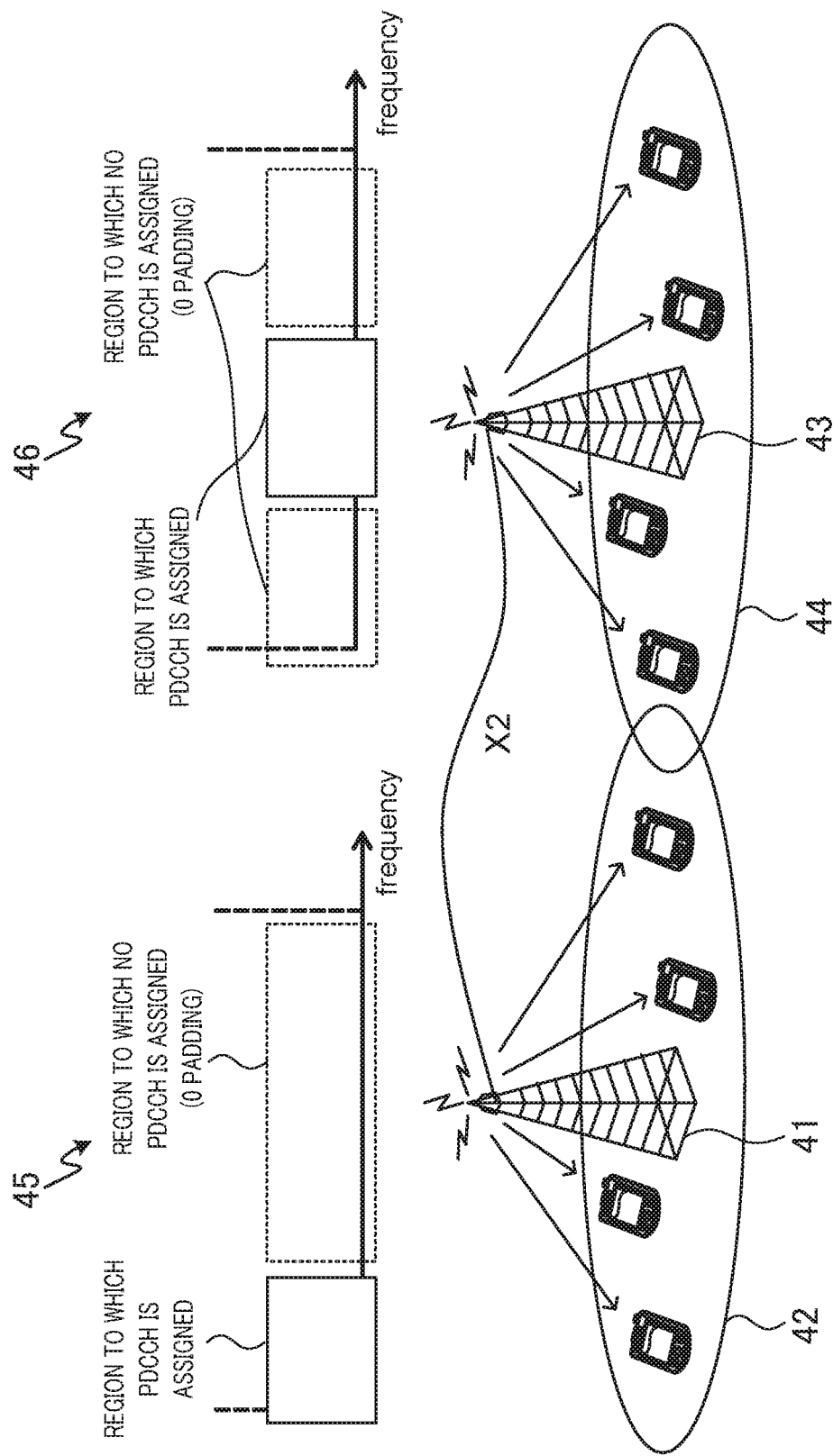
FIG. 21 illustrates a mapping example of the DL control signal according to Modification 7 of Embodiment 2.

FIG. 21 illustrates a mapping example of the DL control signals according to modification 7 of Embodiment 2. FIG. 21 illustrates radio base station 41, cell 42 formed by radio base station 41, radio base station 43, and cell 44 formed by radio base station 43. FIG. 21 also illustrates radio resources 45 of radio base station 41 and radio resources 46 of radio base station 43. As indicated by radio resources 45 and 46, the radio resources of radio base stations 41 and 42 include a frequency region to which the DL control signal is mapped and a frequency region to which the DL control signal is not mapped.

Radio base stations 41 and 43 coordinate the frequency regions of the DL control signals to avoid a collision of the DL control signals between cells 42 and 44. For example, radio base stations 41 and 43 shift the mapping regions of the DL control signals in the frequency regions as indicated by radio resources 45 and 46 to prevent the frequency regions of the DL control signals from overlapping.

Radio base stations 41 and 43 use an X2 interface to exchange the mapping information of the DL control signals on the radio resources. Alternatively, radio base stations 41 and 43 may shift the frequency regions for assigning the DL control signals based on cell IDs.

Radio base stations 41 and 43 use, for example, MIB/SIB, message 2, paging information, RRC connection configuration, or S connection configuration to notify the user terminals under control of the assignment regions of the DL control signals.

In this way, the DL control signals are mapped in different frequency regions in adjacent radio base stations 41 and 43. According to the processing, the radio communication system can prevent a collision of DL control signals.

Embodiment 3

Hereinafter, Embodiment 3 will be described with reference to the accompanying drawings. MIMO (Multiple Input Multiple Output) is applied to a radio communication system in a case described in Embodiment 3.

Figure 22:
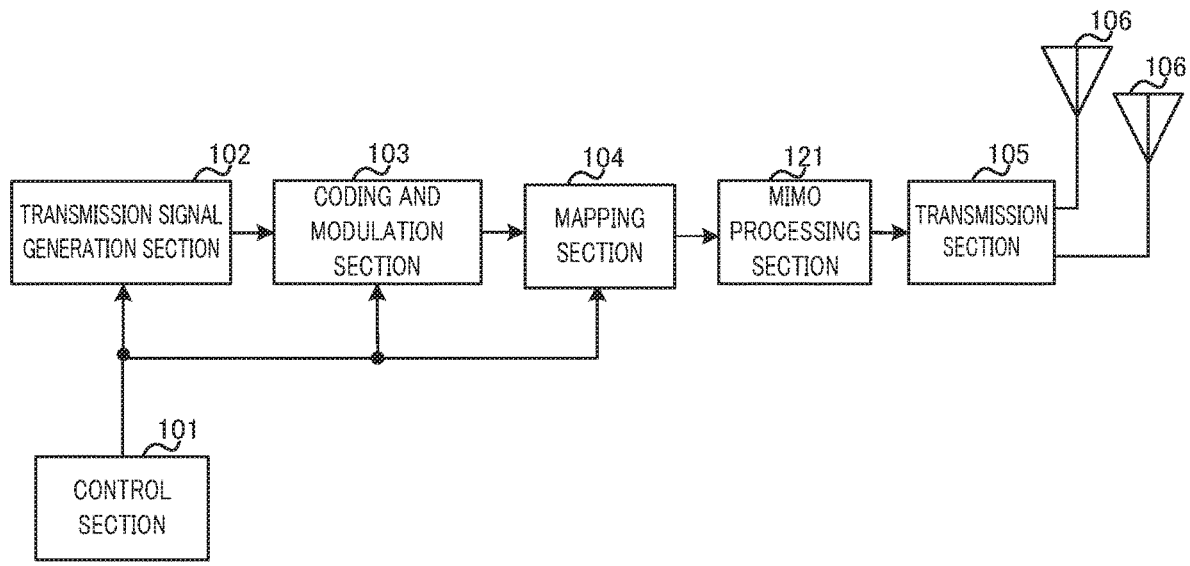
FIG. 22 illustrates a configuration example of functional blocks of the radio base station according to Embodiment 3.

FIG. 22 illustrates a configuration example of functional blocks of the radio base station according to Embodiment 3. In FIG. 22, the same reference signs are provided to the same functional blocks as in FIG. 1. Parts different from FIG. 1 will be described below.

MIMO processing section 121 executes processing necessary for MIMO communication. For example, MIMO processing section 121 spatially multiplexes the DL signals or performs space-time coding.

Figure 23:
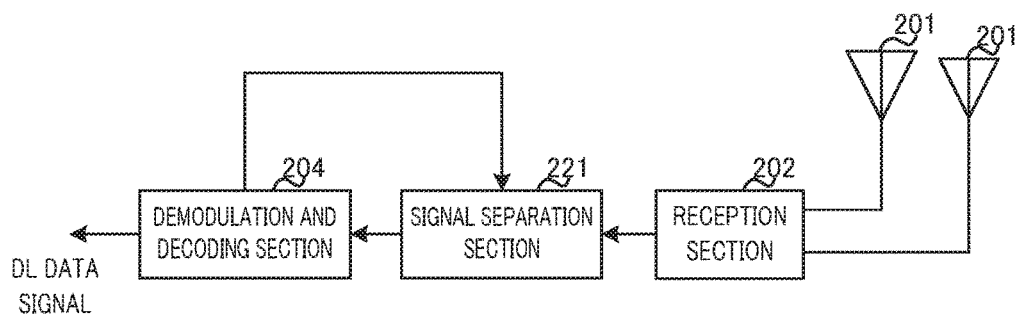
FIG. 23 illustrates a configuration example of functional blocks of the user terminal according to Embodiment 3.

FIG. 23 illustrates a configuration example of functional blocks of the user terminal according to Embodiment 3. In FIG. 23, the same reference signs are provided to the same functional blocks as in FIG. 2. Parts different from FIG. 1 will be described below.

Signal separation section 221 separates the spatially multiplexed DL signals. User terminal 20 also includes, for example, a transmission section not shown and feeds back information necessary for the MIMO communication to radio base station 10.

Figure 24A:
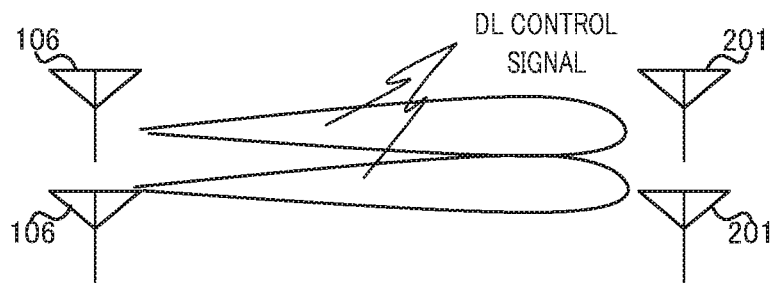
FIG. 24A is a diagram describing transmission of the DL control signal when MIMO is applied.
Figure 24B:
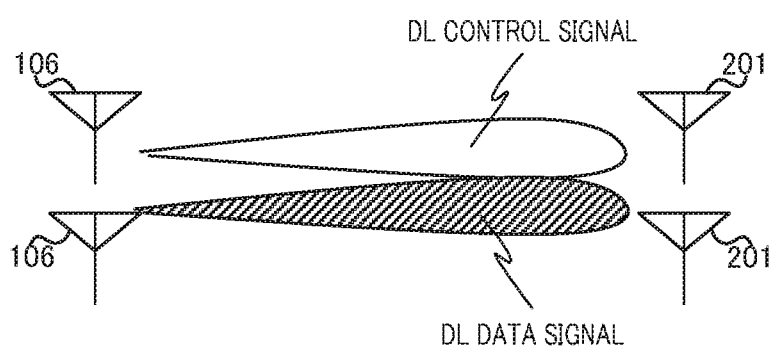
FIG. 24B is a diagram describing transmission of the DL control signal when MIMO is applied.

FIGS. 24A and 24B are diagrams describing transmission of the DL control signal when MIMO is applied. FIG. 24A illustrates antennas 106 of radio base station 10 shown in FIG. 22 and antennas 201 of user terminal 20 shown in FIG. 23. As shown in FIG. 24A, the DL control signal may be assigned to all layers of MIMO (the DL control channel may be constituted by all layers of MIMO). According to the processing, the radio communication system can secure the transmission capacity of the DL control signal. The radio communication system can also improve the reception quality.

FIG. 24B illustrates antennas 106 of radio base station 10 shown in FIG. 22 and antennas 201 of user terminals 20 shown in FIG. 23. As shown in FIG. 24B, the DL control signal may be assigned to part of the layers of MIMO, and the DL data signal may be assigned to other layers of MIMO (the DL control channel may be constituted by part of the layers of MIMO, and the DL data channel may be constituted by other layers of MIMO). According to the processing, the radio communication system can effectively utilize the radio resources. The radio communication system can also secure the transmission capacity of the DL control signal.

[Modification 1 of Embodiment 3]

MU-MIMO is applied in a case described in Modification 1 of Embodiment 3.

Figure 25:
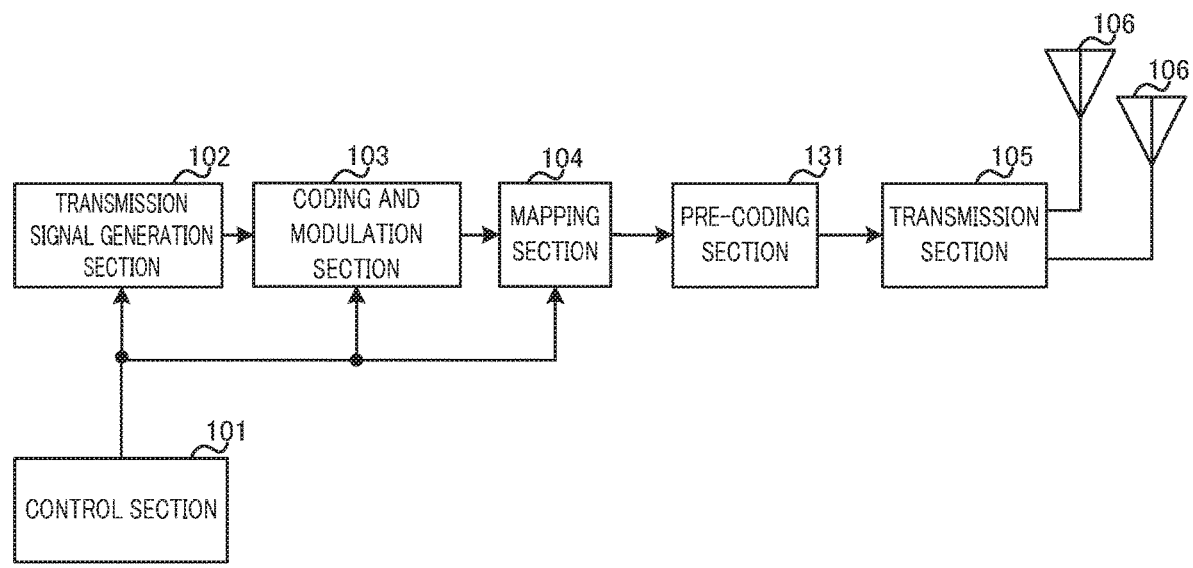
FIG. 25 illustrates a configuration example of functional blocks of the radio base station according to Modification 1 of Embodiment 3.

FIG. 25 illustrates a configuration example of functional blocks of the radio base station according to Embodiment 3. In FIG. 25, the same reference signs are provided to the same functional blocks as in FIG. 1. Parts different from FIG. 1 will be described below.

Radio base station 10 includes pre-coding section 131. For each antenna port, pre-coding section 131 applies pre-coding processing to the DL signal output from mapping section 104.

Figure 26:
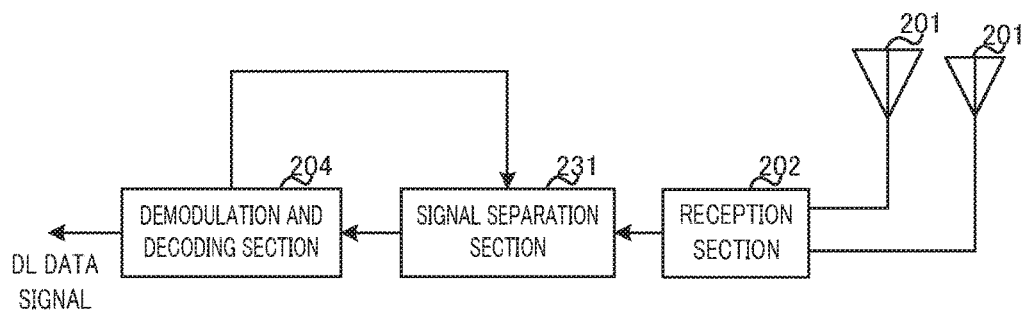
FIG. 26 illustrates a configuration example of functional blocks of the user terminal according to Modification 1 of Embodiment 3.

FIG. 26 illustrates a configuration example of functional blocks of the user terminal according to Embodiment 3. In FIG. 26, the same reference signs are provided to the same functional blocks as in FIG. 1. Parts different from FIG. 2 will be described below.

Signal separation section 231 separates the spatially multiplexed DL signals. User terminal 20 also includes, for example, a transmission section not shown and feeds back information necessary for the MIMO communication to radio base station 10.

Figure 27:
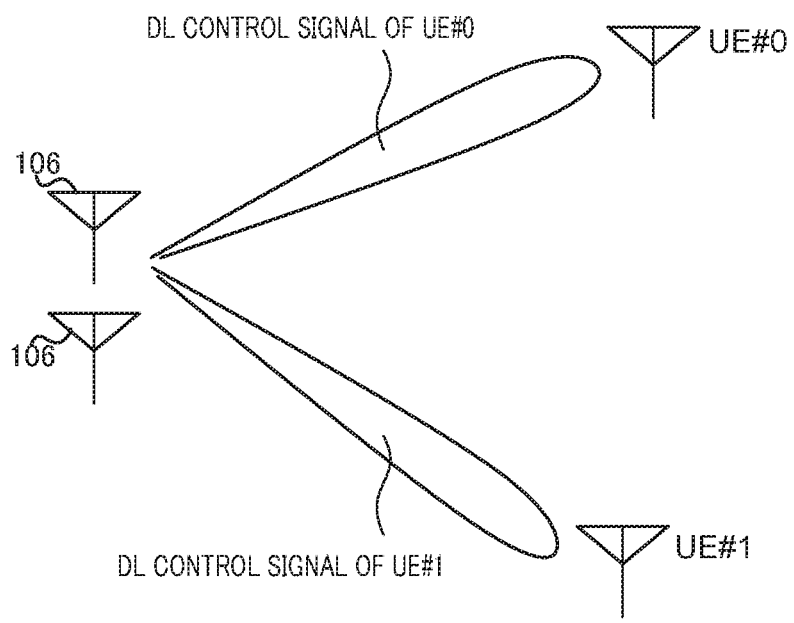
FIG. 27 is a diagram describing transmission of the DL control signal when MIMO is applied.

FIG. 27 is a diagram describing transmission of the DL control signals when MIMO is applied. FIG. 27 illustrates antennas 106 of radio base station 10 shown in FIG. 25. FIG. 27 also illustrates an antenna of user terminal UE #0 and an antenna of user terminal UE #1.

As shown in FIG. 27, the DL control signal addressed to user terminal UE #0 is assigned to a layer of MIMO formed between radio base station 10 and user terminal UE #0. The DL control signal addressed to user terminal UE #1 is assigned to a layer of MIMO formed between radio base station 10 and user terminal UE #1. In this way, the DL control signal addressed to each user may be assigned to a layer of MIMO formed between radio base station 10 and each user terminal. According to the processing, the user terminal just needs to decode the layer assigned to the user terminal, and the reception processing is simplified.

This completes the description of Embodiments of the present invention.

An example of hardware configuration of radio base station 10 and user terminal 20 will be described below. The functional block diagrams used to describe Embodiments illustrate blocks on the basis of functions. The functional blocks (constituent sections) are realized by an arbitrary combination of hardware and/or software. Means for realizing the functional blocks is not particularly limited. More specifically, the functional blocks may be realized by one physically and/or logically coupled apparatus. Two or more physically and/or logically separated apparatuses may be directly and/or indirectly (for example, through a cable and/or wirelessly) connected, and the plurality of apparatuses may realize the functional blocks.

For example, the radio base station, the user terminal, or the like in Embodiment of the present invention may function as a computer that executes processing of the radio communication method of the present invention.

Figure 28:
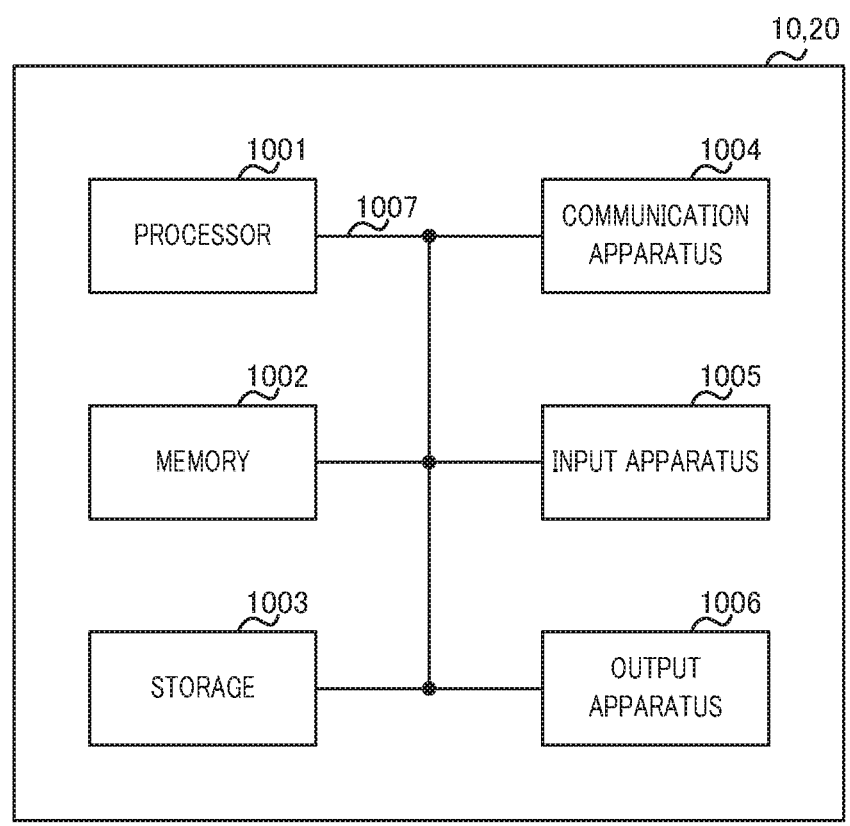
FIG. 28 illustrates an example of a hardware configuration of the radio base station and the user terminal according to Embodiment of the present invention.

FIG. 28 illustrates an example of a hardware configuration of the radio base station and the user terminal according to one embodiment of the present invention. Radio base station 10 and user terminal 20 may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and user terminal 20 may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or by other methods. Note that processor 1001 may be provided by one or more chips.

The functions of radio base station 10 and user terminal 20 are realized by loading predetermined software (program) on the hardware of processor 1001, memory 1002, or the like. Processor 1001 performs operation, and the communication by communication apparatus 1004 or reading and/or writing of data in memory 1002 and storage 1003 is controlled.

Processor 1001 operates, for example, an operating system to control the entire computer. Processor 1001 may be constituted by a central processing unit (CPU) including an interface for peripheral apparatus, a control apparatus, an operation apparatus, a register, and the like. For example, control section 101, transmission signal generation section 102, coding and modulation section 103, mapping section 104, signal separation section 203, demodulation and decoding section 204, and the like may be realized by processor 1001.

Processor 1001 executes various types of processing according to a program (program code), a software module, or data loaded from storage 1003 and/or communication apparatus 1004 to memory 1002. The program used is a program for causing the computer to execute at least part of the operation described in Embodiments. For example, control section 101 of radio base station 10 may be realized by a control program stored in memory 1002 and operated by processor 1001, and the other functional blocks may also be realized in the same way. Although the various types of processing are executed by one processor 1001 in the description, the various types of processing may be executed by two or more processors 1001 at the same time or in succession. Processor 1001 may be provided by one or more chips. Note that the program may be transmitted from a network through a telecommunication line.

Memory 1002 is a computer-readable recording medium and may be constituted by, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to one Embodiment of the present invention.

Storage 1003 is a computer-readable recording medium and may be constituted by, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may be called an auxiliary storage apparatus. The storage medium may be, for example, a database, a server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmission section 105, antenna 106, antenna 201, reception section 202, and the like may be realized by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) for output to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be set by a single bus or may be set by different buses between the apparatuses.

Furthermore, radio base station 10 and user terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may realize part or all of the functional blocks. For example, processor 1001 may be provided by at least one of these pieces of hardware.

Modifications of Present Embodiment

Note that the terms described in the present specification and/or the terms necessary to understand the present specification may be replaced with terms with the same or similar meaning. For example, the channel and/or the symbol may be a signal. The signal may be a message.

The DL data signal may be called a physical downlink shared channel (PDSCH) or a downlink data channel. The DL control signal may be called a physical downlink control channel (PDCCH) or a downlink control channel.

The radio frame may be constituted by one or a plurality of frames in the time domain. One or each of a plurality of frames may be called a subframe, a time unit, or the like in the time domain. The subframe may be further constituted by one or a plurality of slots in the time domain. One subframe may be called a TTI. A plurality of contiguous subframes may be called a TTI. One slot may be called a TTI.

The notification of information is not limited to the modes and Embodiments described in the present specification, and the information may be notified by other methods. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

The aspects and Embodiments described in the present specification may be applied to a system using LTE (Long Term Evolution). LTE-A (LTE-Advanced), SUPER 3G, IMT-Advanced, 4G, 5G, FRA (Future Radio Access), W-CDMA (registered trademark). GSM (registered trademark), CDMA2000, UMB (Ultra Mobile Broadband), IEEE 802.11 (Wi-Hi). IEEE 802.16 (WiMAX), IEEE 802.20. UWB (Ultra-WideBand), Bluetooth (registered trademark), or other appropriate systems and/or to a next-generation system expanded based on these.

The base station (radio base station) can accommodate one or a plurality of (for example, three) cells (also called sectors). When the base station accommodates a plurality of cells, the entire coverage area of the base station can be divided into a plurality of smaller areas, and each smaller area can provide a communication service based on a base station subsystem (for example, small base station for indoor, RRH: Remote Radio Head). The term "cell" or "sector" denotes the base station that performs the communication service in the coverage and/or part or all of the coverage area of the base station subsystem. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

Furthermore, the radio base station in the present specification may be replaced with the user terminal. For example, the modes and Embodiments of the present invention may be applied to a configuration in which the communication between the radio base station and the user terminal is replaced with communication between a plurality of user terminals (D2D: Device-to-Device). In this case, user terminal 20 may be provided with the functions of radio base station 10. Furthermore, the term "uplink," "downlink," or the like may be replaced with "side." For example, the uplink channel may be replaced with a side channel.

Similarly, the user terminal in the present specification may be replaced with the radio base station. In this case, radio base station 10 may be provided with the functions of user terminal 20.

Specific operations performed by the base station (radio base station) in the specification may be performed by an upper node depending on the situation. Various operations performed for communication with a terminal in a network including one or a plurality of network nodes including a base station can be obviously performed by the base station and/or a network node other than the base station (examples include, but not limited to, MME (Mobility Management Entity) or S-GW (Serving Gateway)). Although there is one network node other than the base station in the case illustrated above, a plurality of other network nodes may be combined (for example, MME and S-GW).

The information, the signal, and the like can be output from a higher layer (or a lower layer) to a lower layer (or a higher layer). The information, the signals, and the like may be input and output through a plurality of network nodes.

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

The judgement may be made based on a value expressed by 1 bit (0 or 1), based on a Boolean value (true or false), or based on comparison with a numerical value (for example, comparison with a predetermined value).

As used herein, the term "determining" may encompasses a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When used in the present specification, two elements can be considered to be "connected" or "coupled" to each other by using one or more electrical wires, cables, and/or printed electrical connections or by using electromagnetic energy, such as electromagnetic energy with a wavelength of a radio frequency region, a microwave region, or an optical (both visible and invisible) region that are non-limited and non-inclusive examples.

The terms "including", "comprising", and modifications of these are intended to be inclusive just like the term "having", as long as the terms are used in the present specification or the appended claims. Furthermore, the term "or" used in the present specification or the appended claims is not intended to be an exclusive or.

The description "based on" used in the present specification does not mean "based on only," unless otherwise specifically stated. In other words, the description "based on" means both of "based on only" and "based on at least."

The "section" in the configuration of each apparatus may be replaced with "means," "circuit," "device," or the like.

When articles, such as "a," "an," and "the" in English, are added by translation in the entire disclosure, the articles include plural forms unless otherwise clearly indicated by the context.

Regardless of whether the software is called software, firmware, middleware, a microcode, or a hardware description language or by other names, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the command, and the like may be transmitted and received through a transmission medium. For example, when the software is transmitted from a website, a server, or other remote sources by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

The terms "system" and "network" used in the present specification can be interchangeably used.

The information, the parameters, and the like described in the present specification may be expressed by absolute values, may be expressed by values relative to predetermined values, or expressed by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

The orders of the processing procedures, the sequences, the flow charts, and the like of the aspects and Embodiments described in the present specification may be changed as long as there is no contradiction. For example, elements of various steps are presented in exemplary orders in the methods described in the present specification, and the methods are not limited to the presented specific orders.

The aspects and Embodiments described in the present specification may be independently used, may be combined and used, or may be switched and used along the execution. Furthermore, notification of predetermined information (for example, notification indicating "it is X") is not limited to explicit notification, and the notification of the predetermined information may be implicit (for example, by not notifying the predetermined information).

Although the present invention has been described in detail, it is obvious for those skilled in the art that the present invention is not limited to Embodiments described in the present specification. Modified and changed modes of the present invention can be carried out without departing from the spirit and the scope of the present invention defined by the description of the appended claims. Therefore, the description of the present specification is intended for exemplary description and does not limit the present invention in any sense.

INDUSTRIAL APPLICABILITY

An aspect of the present invention is useful for a mobile communication system.

The present patent application claims the benefit of priority based on Japanese Patent Application Laid-Open No. 2016-245981 field on Dec. 19, 2016, and the entire content of Japanese Patent Application Laid-Open No. 2016-245981 is hereby incorporated by reference.

REFERENCE SIGNS LIST

10 Radio base station
101 Control section
102 Transmission signal generation section
103 Coding and modulation section
104 Mapping section
105 Transmission section
106 Antenna
20 User terminal
201 Antenna
202 Reception section
203 Signal separation section
204 Demodulation and decoding section

The invention claimed is:
1. A terminal comprising:
a reception section that receives a downlink signal including a downlink control signal and a downlink data signal from a first radio base station; and
a demodulation and decoding section that uses the downlink control signal to demodulate and decode the downlink data signal, wherein the downlink control signal is mapped to a signal transmission point of a single carrier in units of control channel elements, and wherein a plurality of the signal transmission points constitute a symbol, the symbol includes a first time region in which the downlink control signal is mapped and a second time region in which the downlink control signal is not mapped, and the first time region is different from a first time region of an adjacent radio base station, wherein, in a case when the control channel elements have an aggregation level equal to 2 and the control channel elements are positioned adjacent to each other, the plurality of the signal transmission points are located within the same symbol, wherein, in a case when the control channel elements have an aggregation level equal to 2 and the control channel elements are not positioned adjacent to each other, the plurality of the signal transmission points are located within more than one symbol, wherein the downlink control signal is repeatedly mapped in one of the control channel elements or repeatedly mapped between the control channel elements, and wherein a plurality of symbols constitutes a subframe, and the downlink control signal of the downlink signal for each of a plurality of the subframes is mapped in a specific one or more of the subframes.

2. The terminal according to claim 1, wherein the downlink control signal is transmitted in all layers or part of the layers of MIMO (Multiple Input Multiple Output).

3. A terminal comprising:

a reception section that receives a downlink signal including a downlink control signal and a downlink data signal from a first radio base station; and a demodulation and decoding section that uses the downlink control signal to demodulate and decode the downlink data signal, wherein the downlink control signal is mapped to contiguous subcarriers of discrete fourier transform spread orthogonal frequency division multiplexing, DFT-s-OFDM, in units of control channel elements, and wherein the downlink control signal is mapped in a first frequency region and the downlink control signal is not mapped in a second frequency region and the first frequency region is different from a first frequency region of an adjacent radio base station, wherein, in a case when the control channel elements have an aggregation level equal to 2 and the control channel elements are positioned adjacent to each other, the plurality of the signal transmission points are located within the same symbol, wherein, in a case when the control channel elements have an aggregation level equal to 2 and the control channel elements are not positioned adjacent to each other, the plurality of the signal transmission points are located within more than one symbol, wherein the downlink control signal is repeatedly mapped in one of the control channel elements or repeatedly mapped between the control channel elements, and wherein a plurality of symbols constitutes a subframe, and the downlink control signal of the downlink signal for each of a plurality of the subframes is mapped in a specific one or more of the subframes.

4. The terminal according to claim 3, wherein the downlink control signal is transmitted in all layers or part of the layers of MIMO (Multiple Input Multiple Output).

* * * * *